United States Patent [19]
Naito et al.

[11] Patent Number: 5,590,694
[45] Date of Patent: Jan. 7, 1997

[54] METHOD AND APPARATUS FOR WINDING AND FIXING BAND

[75] Inventors: Shiro Naito; Tomohiko Yamamoto; Tomonori Yamamoto, all of Saitama-ken, Japan

[73] Assignee: Honda Giken Kogyo Kabushiki Kaisha, Tokyo, Japan

[21] Appl. No.: 404,233

[22] Filed: Mar. 15, 1995

[30] Foreign Application Priority Data

| Nov. 1, 1994 | [JP] | Japan | 6-268789 |
| Nov. 1, 1994 | [JP] | Japan | 6-268799 |
| Nov. 1, 1994 | [JP] | Japan | 6-268800 |
| Nov. 1, 1994 | [JP] | Japan | 6-268827 |
| Nov. 1, 1994 | [JP] | Japan | 6-268835 |

[51] Int. Cl.$^6$ .................................................. B23P 19/04
[52] U.S. Cl. ........................................... 140/93.2; 100/29
[58] Field of Search ............................. 140/93.2; 100/25, 100/29, 32, 26, 33 R; 219/121.64

[56] References Cited

U.S. PATENT DOCUMENTS

| 4,564,988 | 1/1986 | Norrod . |
| 5,321,879 | 6/1994 | Oetiker . |
| 5,325,578 | 7/1994 | Oetiker . |

FOREIGN PATENT DOCUMENTS

| 57-15153 | 1/1982 | Japan . |
| 63 20514 | 6/1988 | Japan . |
| 2076648 | 3/1990 | Japan . |
| 4201133 | 7/1992 | Japan . |
| 4201132 | 7/1992 | Japan . |
| 4347074 | 12/1992 | Japan . |

*Primary Examiner*—Kenneth J. Ramsey
*Attorney, Agent, or Firm*—Weiner, Carrier & Burt, P.C.; Joseph P. Carrier; Irving M. Weiner

[57] ABSTRACT

The disclosed invention is a method and apparatus for winding a band, such as a metal band, around a flexible boot and fixing it thereto. Band clamping members are provided including right and left upper members and right and left lower members, and band guide surfaces on inner portions of the clamping members form an approximately round shape when these clamping members are closed. An inserted band is prevented from being caught along the band guide surfaces due to the structure thereof, and the band is wound around the outer circumference of the boot smoothly and reliably. After winding, welding and the cutting of the excess part of the band are carried out reliably and efficiently.

39 Claims, 20 Drawing Sheets

METHOD AND APPARATUS FOR WINDING AND FIXING BAND

BACKGROUND OF THE INVENTION

1. Field of the Invention

The present invention relates to a method and apparatus for winding and fixing a band wound around both ends of a boot covering the opening of an equal velocity joint coupled to the end of a drive shaft in an automobile to fix the boot covering to the circumference of the opening of the joint and the circumference of the shaft.

2. Description of the Related Art

In an equal velocity joint structure at both ends of a drive shaft in an automobile, the circumference of the opening of the joint has conventionally been covered with a boot of rubber to prevent dust and moisture from entering the coupling section of the joint and to obstruct grease from splashing inside the structure.

JP-Y2-63-20514 has been disclosed as a technique for fixing such a boot.

This technique winds a metal band around a boot, then clamps the outer circumference of the band to reduce the diameter of the boot, and welds the overlapping part of the band. With this technique, tension cannot be applied to the band wound around the boot as clamped.

JP-A-4-47074 has thus been disclosed as a technique for applying tension to the band upon clamping.

In this technique, a structure with a cam mechanism for circumferentially varying the clamping of the outer circumference is used to sequentially vary the pressure from center to both ends of the band to prevent its looseness. This technique, however, enables the band to be clamped but does not allow it to be inserted conveniently. That is, this technique uses a retaining member to surround a boot with a gap maintained, inserts the band into the gap, and winds it around the outer circumference of the boot, using the inner surface of the retaining member as a guide surface for the band. This structure is insufficient for the inner surface of the clamping member to act as a guide surface for the band. In addition, the cam mechanism for circumferentially controlling the clamping member on the outer circumference is complicated.

This invention is intended to solve this problem of the related art structures.

It is an object of this invention to provide a method and apparatus for winding and fixing a band which uses a simple mechanism and structure to insert the band smoothly and applies tension thereto to prevent it from loosening in order to reliably wind and fix it.

It is another object of this invention to provide a method and apparatus for winding and fixing a band which ensures the smooth and reliable winding and fixation of the band, simplifies mechanisms for winding, pressing, and welding the band and cutting off the unwanted part of the band, and is suitable for practical use.

SUMMARY OF THE INVENTION

The coupling of an equal velocity joint to both ends of a drive shaft results in an opening between the joint and the shaft. A boot is thus used to cover the opening. The large diameter end of the boot is fixed to the outer circumference of the joint while the small diameter end of the boot is fixed to the outer circumference of the shaft, by winding a metal band around the corresponding sites. This invention is a method for winding and fixing a band to the outer circumference of a boot and a specific apparatus for implementing this method.

According to this invention, a lateral pair of upper clamping members and a lateral pair of lower clamping members surround a boot to form a gap between the inner surface of each of the clamping members and the outer circumferential surface of the boot. A band is then inserted into the gap and wound around the outer circumference of the boot. The ends of the band are allowed to overlap each other on the boot, and this overlapping part is welded. In this method, when the band is inserted, the inner surfaces of the clamping members forms an approximately round shape, and after the insertion, the lower clamping members are moved upward to press the lower end of the band against the boot. The upper clamping members are then moved inward, and the upper ends of the lower clamping members are also moved inward to clamp the band upward against the boot. The upper clamping members are then used to clamp the upper part of the band. The unwanted part of the band is then cut off and the overlapping part of the band is welded. This invention is such a method for winding and fixing a band and an apparatus for implementing this method.

Each of the clamping members has a block-like guide plate for guiding an inserted band. The inner surfaces of the guide plates form a continuous, approximately round shape along the guide plates. The ends of the guide plates engage with each other in such a way that the inner surfaces of the guide plates will be continuous, thereby enabling the band to travel and be guided smoothly and reliably. When the band is inserted and fed around the outer circumference of the boot, it is prevented from being caught due to the approximately round shape of the inner surfaces of the guide plates on which the band travels, thereby enabling the band to be wound and fixed efficiently, smoothly, and promptly.

A back bar is placed between the overlapping part of the band and the upper part of the boot located below, and a clamp is used to press the overlapping part, which is then welded. This configuration thus prevents the boot from being thermally affected during welding. This clamp also acts as a cutter for cutting off the unwanted part of the band, thereby simplifying the required mechanism. The use of both clamp and back bar to press the overlapping part of the band results in reliable welding of this part.

The lateral pair of lower clamping members, the lower ends of which are supported via the shaft, press the band upward, and tilt inward when the lateral pair of upper clamping members move inward. Thus, upward pressure is applied to the band to pull it upward to remove its looseness, and the lower clamping members tilt inward in response to the inward movement of the upper clamping members. This is advantageous for the insertion and guidance of the band. The required mechanism is also simplified because the lower clamping members are closed and tilted in response to the inward movement of the upper clamping members.

In addition, according to this invention, when the back bar is placed between the band and the boot, lubricating oil is applied to that part of the boot which abuts the back bar. This enables the back bar to be pulled out smoothly and easily after the welding of the overlapping part of the band due to the effect of lubricating oil. This in turn prevents biased elongation of the boot or a scratch thereon caused by the pulling-out of the back bar.

To implement the above method for winding and fixing a band, this invention also includes a device for determining whether or not the band is fed properly. Whether or not the band is wound around the outer circumference of the boot properly can thus be determined, and if not, this condition is visually and acoustically indicated to allow the operator to stop the winding operation, thereby preventing the band from being wound around the boot incorrectly to avoid the production of products with an improperly wound band. Other objects, advantages and salient features of the invention will be apparent from following detailed description which, when taken in conjunction with the annexed drawings, discloses a preferred embodiment of the invention.

DETAILED DESCRIPTION

A preferred embodiment of this invention is described with reference to the accompanying drawings.

A method and apparatus for winding and fixing a band is intended for an equal velocity joint coupled to both ends of a drive shaft, and particularly for the winding and fixation of a band to a rubber boot installed between the joint and the shaft so as to cover an opening formed at axially opposite ends of the joint.

Figure 22:
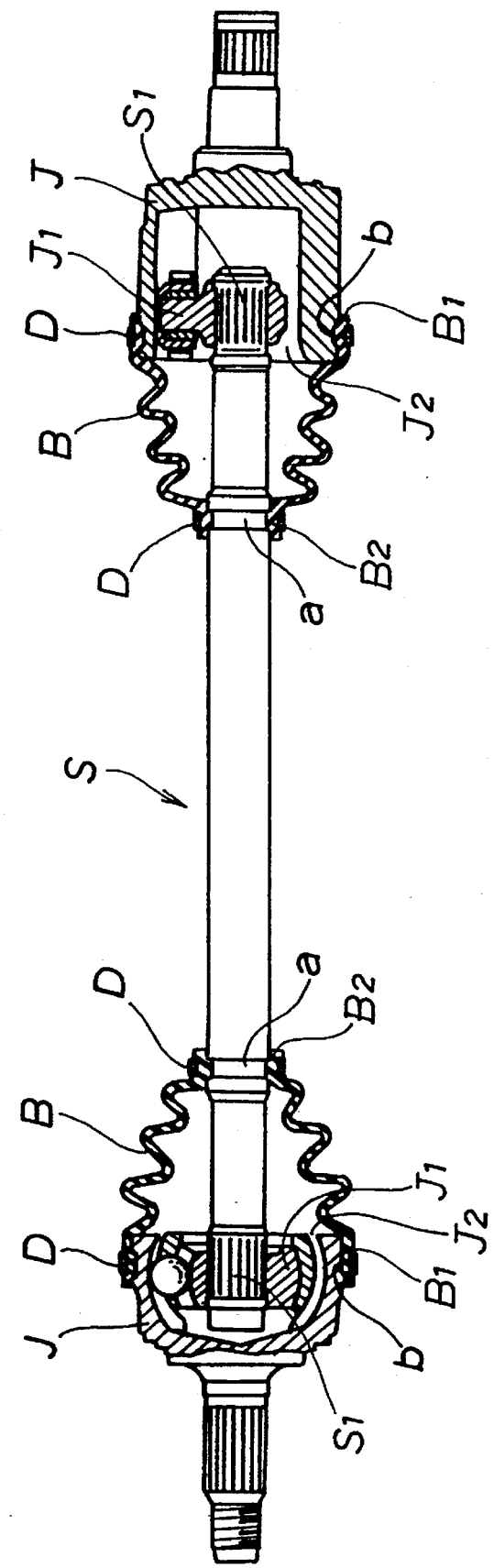
FIG. 22 is a cross section showing a drive shaft, part of an equal velocity joint, and the boot.

A drive shaft (S) is as shown in FIG. 22. The shaft (S) has the inner section ($J_1$) of an equal velocity joint (J) coupled to each end ($S_1$) thereof. The joints (J) are axially faced with each other, and each of the joints has openings ($J_2$) in its opposite inner sections. To cover the openings ($J_2$), a bellows-like boot (B) is installed and fixed between the outer circumference of that end of each of the joints (J) which is opposite to the corresponding end of the other joint and the outer circumference of each of the intermediate ends of the shaft (S).

The boot (B) has its larger diameter end ($B_1$) attached to the outer circumferential end (b) of the joint (J). On the other hand, the boot (B) has its small diameter end ($B_2$) attached to that small diameter part of the shaft (S) which is an engagingly lock section (a) spaced axially from the opposite engagingly lock section. A metal band (D) is wound around the outer circumference of both axial ends ($B_1$), ($B_2$) of the boot (B) to fix the boot in such a way that the boot can extend from the joint (J) to the shaft (S), thereby covering the openings in the joint (J).

Figure 1:
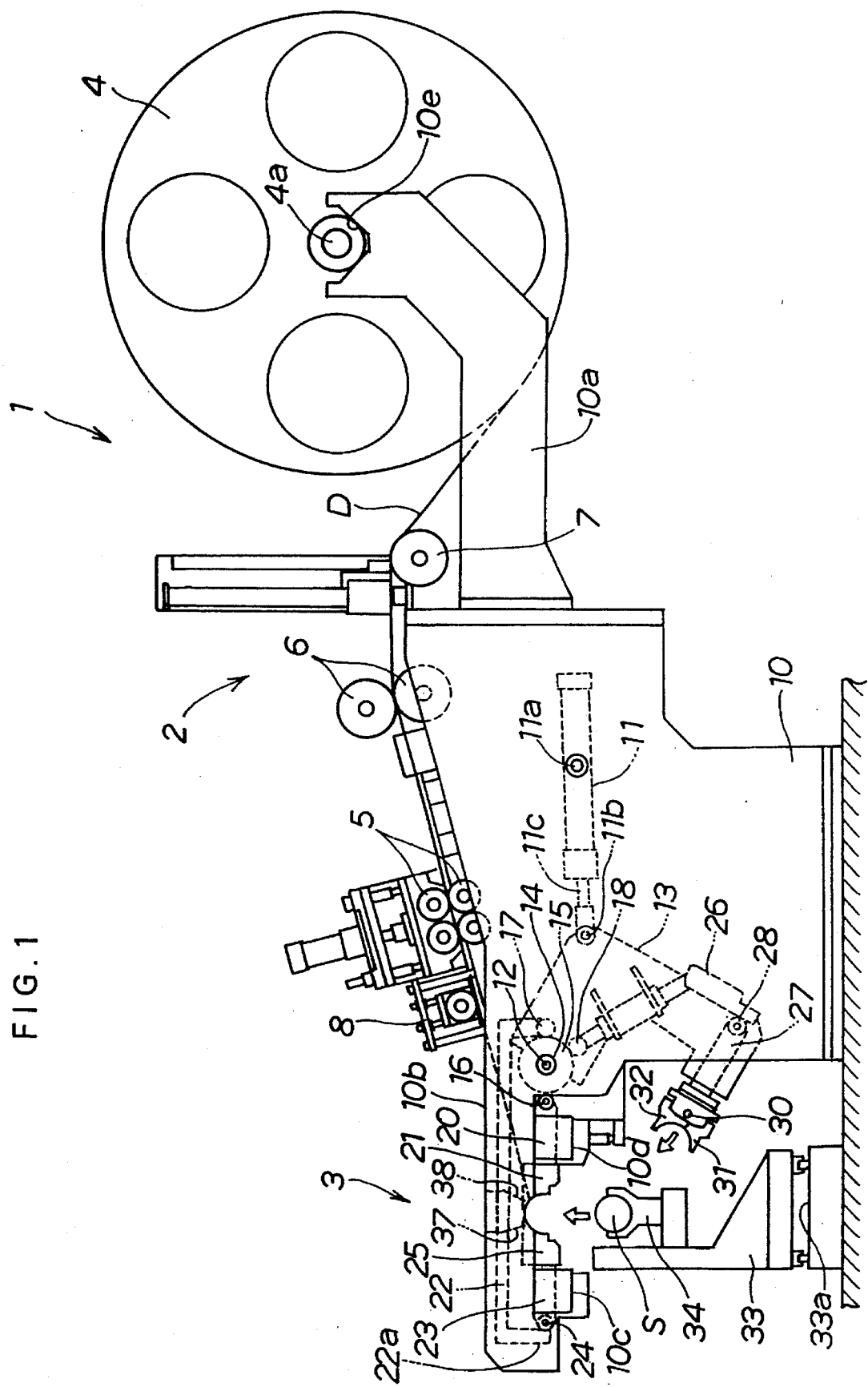
FIG. 1 is a side view showing the overall apparatus for winding and fixing a band which implements a method according to this invention.

FIG. 1 shows an approximate configuration of an apparatus for winding and fixing a band used for the above operation.

An apparatus for winding and fixing a band (referred to as an "apparatus" below) shown at 1 comprises a band supply section 2 for supplying a band (D) and a band fixation section 3 for winding and fixing a supplied band (D) to the boot (B). The band supply section 2 has at its most upstream section a reel 4 for rewinding and retaining a coil-like metal band. The bearing 10c of a forked arm 10a installed behind a base 10 supports a shaft 4a to retain the reel 4 in such a way that the band (D) can be withdrawn from the reel 4.

The base 10 has thereon a tension roller 7 for applying tension to the band (D) from upstream and a vertical pair of guide rollers 6, 6 for guiding the withdrawal of the band (D) which are located after the tension roller. A plurality of pinch rollers 5 are installed after the guide rollers and arranged both vertically and in the withdrawing direction so as to withdraw the band (D). A count roller 8 for detecting the amount of withdrawn band is located after the pinch rollers and immediately before the band fixation section 3. Control for the withdrawal of the band, the amount of withdrawn band, the insertion of the band between band clamping members and the boot, and the evaluation of insertion conditions is described below.

The band fixation section 3 is disposed in front of the base 10. An oscillating arm 13 that is part of the mechanism of the fixation section 3 is installed in the middle front of the base 10. The oscillating arm 13 is supported by the base 10 via a shaft 12, and oscillates using the shaft 12 as a supporting point. As shown, the oscillating arm 13 has a square inverse C shape as viewed sideward. The upper square part of the oscillating arm 13 is coupled by a shaft 11b to a cylinder unit 11 supported by the base 10 via a shaft 11a.

A cam shaft 14 is installed around the shaft 12. The cam shaft 14 is driven by a driving source such as a motor (not shown). The cam shaft 14 has a plate cam 15 integrally attached thereto so that the cam 15 is rotated when the cam shaft 14 is driven.

Figure 2:
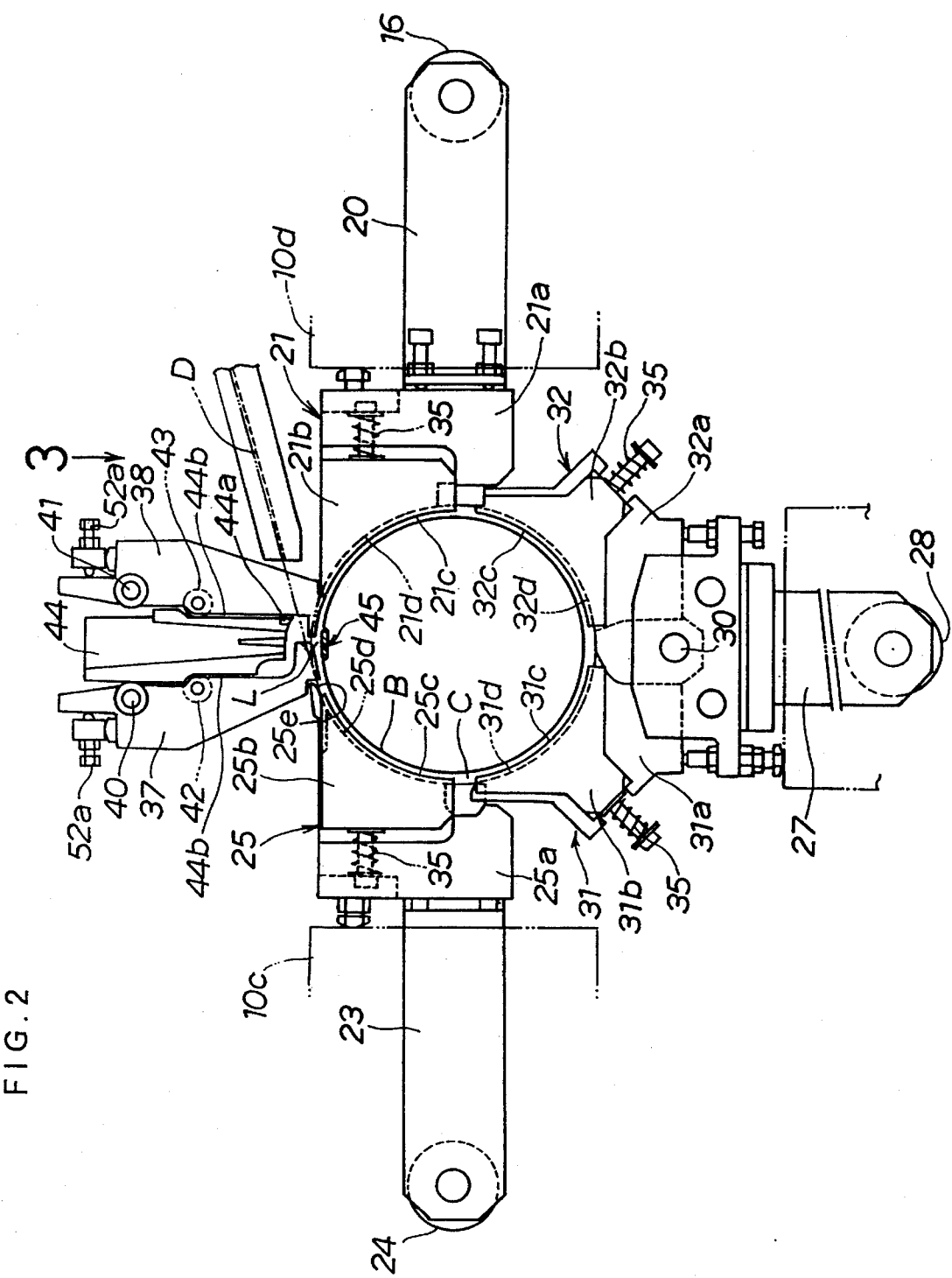
FIG. 2 is an enlarged view of the integral part of FIG. 1, and shows the insertion of a band into a gap between the inner surfaces of clamping members and the outer circumference of a boot.

The outer circumference of the cam 15 engages with each cam roller 16, 17, 18. The cam roller 16 shown on the left of FIG. 1 and on the right of FIG. 2 is attached via a shaft 16a to the outer end of a first pusher 20 extending longitudinally in the figure. The first pusher 20 has a fourth clamping member 21 attached to the inner end thereof.

A cam roller 17 located to the right of cam shaft 16 in FIG. 1 is installed at the trailing end of a slider 22 which is closer to the cam 15. The cam roller 17 engages with the cam 15, and the slider 22 has an inverse channel-like shape and extends forward beyond the cam 15. The front end 22a of the slider 22 trails downward, and engages with a roller 24 supported by the outer end of a second pusher 23 via a shaft. The second pusher 23 is located opposite to the first pusher 20. The second pusher 23 has a first clamping member 25 attached to the inner end thereof. The first and the fourth clamping members 25, 21 constitute a lateral pair of upper clamping members.

The cam roller 18 is supported by one end of a link mechanism 26 attached to the oscillating arm 13. The other end of the link mechanism 26 engages with a roller 28 at the lower end of a third pusher 27. A second and a third clamping members 31, 32 are pivotably connected to the upper end of the third pusher 27 via a shaft 30, as clearly shown in FIG. 2. The second and the third clamping members constitute a lateral pair of lower clamping members.

With the above configuration, when the cylinder unit 11 is driven to oscillate the oscillating arm 13 upward, the first, the second, the third, and the fourth clamping members 25, 31, 32, 21 gather and surround the boot (B), as shown in FIG. 2. In FIG. 1, the clamping members are opened. The details are described below.

On the other hand, a transfer table 33 is located below the band fixation section 3 in such a manner that it can move in a direction perpendicular to the sheet of drawing. The transfer table 33 includes a retaining equipment for retaining the drive shaft (S) in such a way that the drive shaft can be elevated and lowered. The transfer table 33 travels on a rail 33a installed below to transfer the drive shaft downward from the fixation section 3. The retaining equipment 34 installed on the transfer table 33 is then elevated. The drive shaft (S) elevated and retained by the retaining equipment 34 has its shaft gripped in position by a gripping mechanism (not shown) installed in the base 10. The gripping mechanism has a common mechanism.

Figure 3:
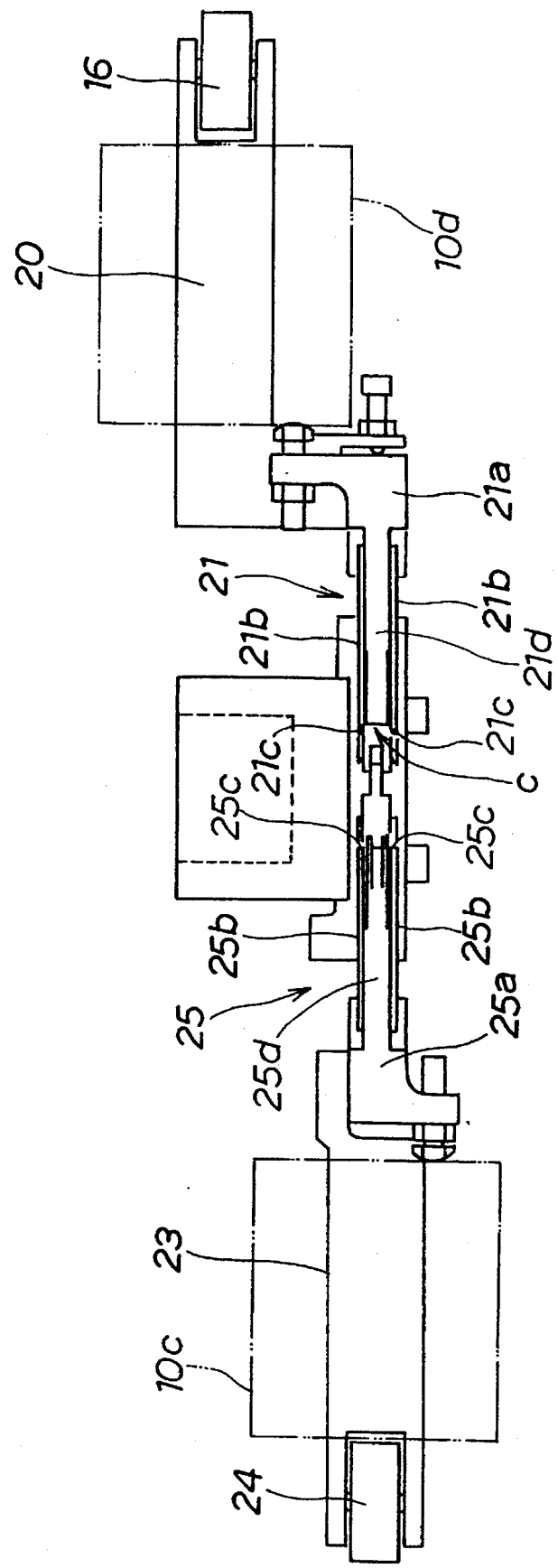
FIG. 3 is a different representation of FIG. 2 as viewed from the direction shown by arrow 3.

Next, referencing FIGS. 2 and 3, the first to fourth clamping members 25, 31, 32, 21 are described in detail.

Figure 7:
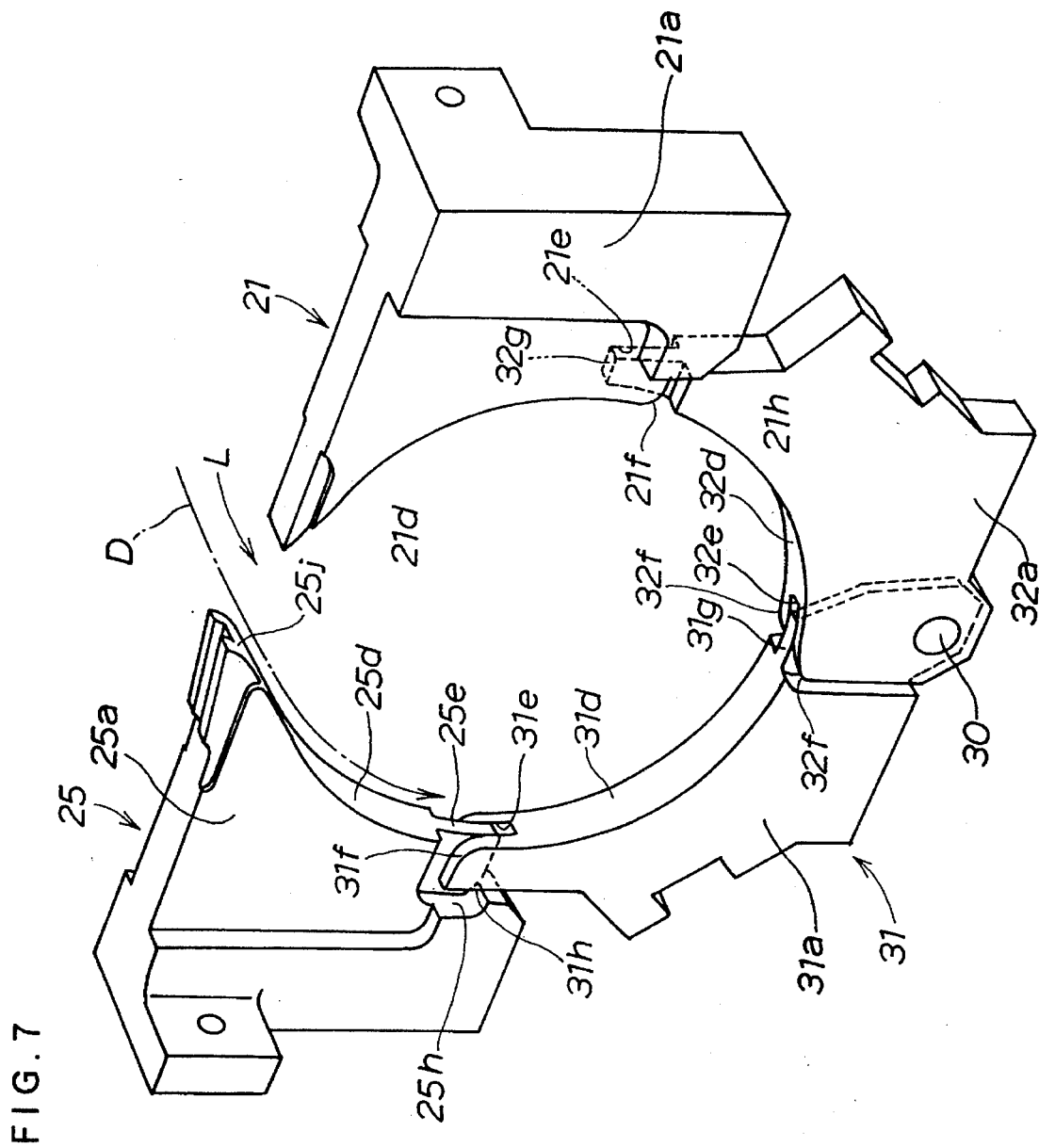
FIG. 7 is a perspective view of a clamping guide plate located in the middle of the clamping member.

When the cylinder unit 11 is driven to oscillate and elevate the second and the third clamping members 31, 32, the first to fourth clamping members 25, 31, 32, 21 surround the boot (B) like a circle with a gap (C) maintained between the clamping members and the boot. The first to fourth clamping members 25, 31, 32, 21 include inner guide plates 25a, 31a, 32a, 21a, respectively. The shape and structure of the guide plates are is as shown in FIG. 7, and the guide plate comprises a guide mechanism for feeding the band (B) smoothly and reliably, as shown in FIG. 7. The guide mechanism is described below.

A side plate 25b, 31b, 32b, 21b capable of moving forward and backward in the radial direction of the boot (B), that is, the drive shaft (S) or the joint (J), is installed on both outer surfaces of each of the guide plates 25a, 31a, 32a, 21a, respectively. These side plates 25b, 31b, 32b, 21b are installed so as to sandwich the inner guide plate 25a, 31a, 32a, 21a, respectively.

The guide plate 25a of the first clamping member 25 is attached to the inner end of the second pusher 23. The guide plates 31a, 32a of the second and the third clamping members 31, 32 are pivotably connected to the shaft 30 of the third pusher 27. The guide plate 21a of the fourth clamping member 21a is attached to the inner end of the first pusher 20.

The first and the second pushers 20 and 23 are supported by front and rear holder sections 10c, 10d, respectively, both located in the front 10b of the base 10 in such a way that they can move longitudinally. A spring 35 is installed between part of the outer end of the inner guide plate 25a, 31a, 32a, 21a and the outer end of each of the side plates 25b, 31b, 32b, 21b, respectively. The spring 35 is used to press each of the side plates 25b, 31b, 32b, 21b inward. This enables the front edge 25c, 31c, 32c, 21c of each of the side plates 25b, 31b, 32b, 21b to protrude beyond the front edge 25d, 31d, 32d, 21d of the guide plate 25a, 31a, 32a, 21a, respectively.

This results in the gap (C) between the front edges 25d, 31d, 32d, 21d of the guide plates 25a, 31a, 32a, 21a, and the front edges 25c, 31c, 32c, 21c of each of the side plates 25b, 31b, 32b, 21a, respectively, as partly shown in FIG. 3. Although only the gap in the inner surface 21d of the guide plate 21a is shown in FIG. 3, the gap is formed between any other guide plate and its corresponding side plate. The width of the gap (C) is set to a value slightly larger than that of the band (D) so as to regulate the width direction of the band guided by the inner circle guide surface formed by the front edges 25d, 31d, 32d, 21d of the guide plates.

The front edges 25d, 31d, 32d, 21d of the guide plates must be set to form an approximately round shape when the guide plates 25, 31, 32, 21 are closed. The width of the front edge 25d, 31d, 32d, 21d of each of the guide plates constituting an inner surface on which the band (D) travels is set to be approximately the same as or slightly larger than that of the band (D).

A guide section 25j the receiving side of which protrudes upward to allow the band (B) to enter easily is formed at the upper tip of the first clamping member 25, as shown in FIGS. 2 to 7.

Figure 6:
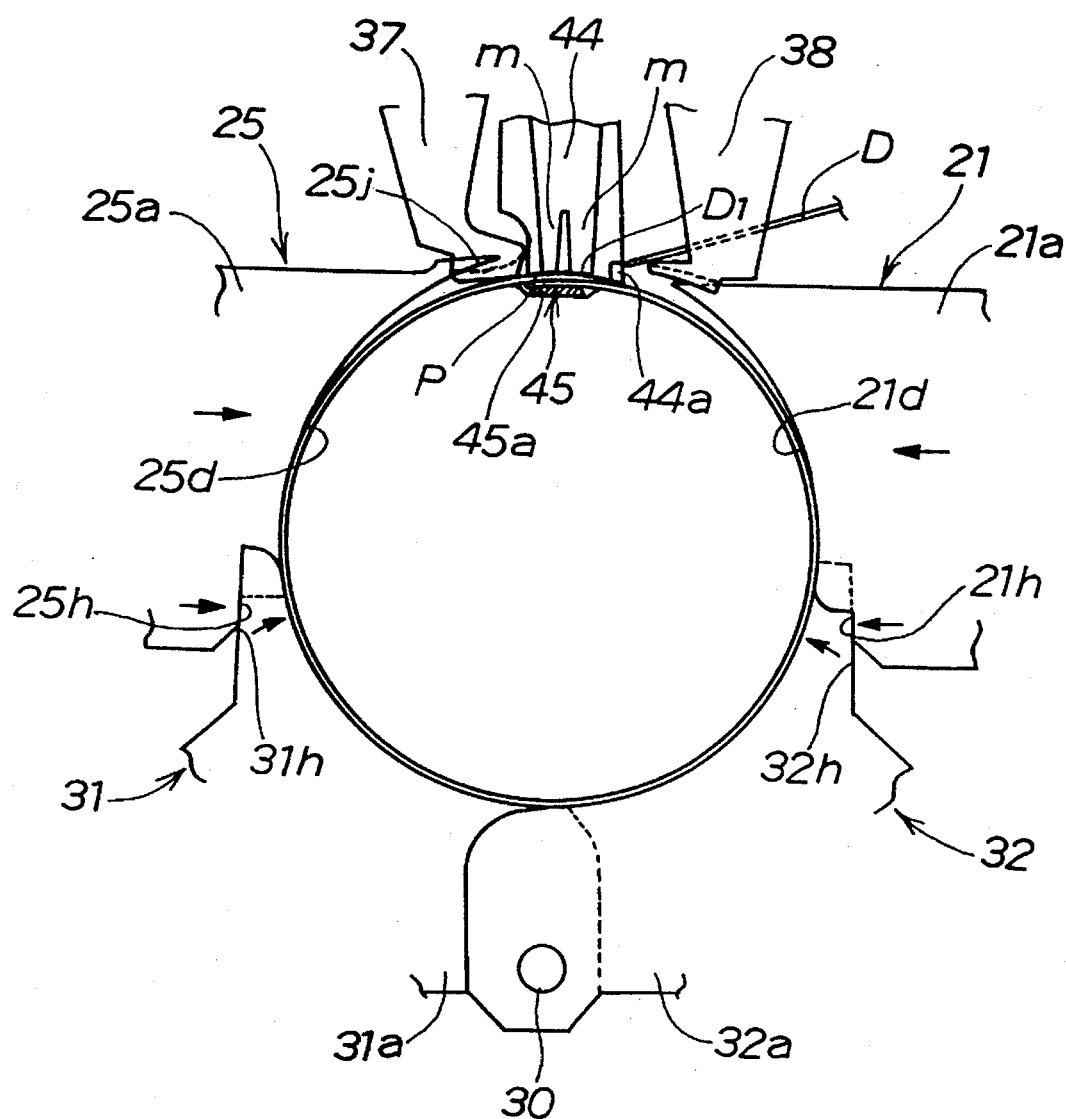
FIG. 6 depicts the inward movement of lower lateral clamping members after the operation in FIG. 5.

The band (D) enters the gap between the first and the fourth clamping member 25 and 21 located in the upper part of the clamping means, as shown in FIG. 2. To insert the band (D), the band (D) is pushed along the inner surfaces 25d, 31d, 32d, 21d of the guide plates 25a, 31a, 32a, 21a. The band (D) is guided along the inner surfaces 25d, 31d, 32d, 21d because these surfaces form a continuous approximately round shape. The width direction of the band (D) is regulated by the front edges 25c, 31c, 32c, 21c of the pair of side plates 25b, 31b, 32b, 21b to wind the band around the boot (B) inside the clamping members 25, 31, 32, 21. The band forms an overlapping part ($D_1$) on the boot, as shown in FIG. 6.

As described above, the approximately round shape of the inner surfaces 25d, 31d, 32d, 21d enables the band (D) to be wound smoothly around circumference of the boot (B). The width direction of the band (D) is regulated and guided by the side plate front edges 25c, 31c, 32c, 21c.

An insertion gap L that enables the band (D) to be inserted is formed between the upper ends of the first and the fourth clamping members 25 and 21, and the gap L is relatively large in the longitudinal direction in the figure. The guide plate 25a of the first clamping member 25, the guide plate 31a of the second clamping member 31 located below the clamping member 25 and downstream relative to the band insertion direction, the guide plate 32a of the third clamping member 32 located to the right of the clamping member 31 and downstream relative to the band insertion direction, and the guide plate 21a of the fourth clamping member 21 located above the clamping member 32 and downstream relative the band insertion direction are configured as follows.

Figure 8:
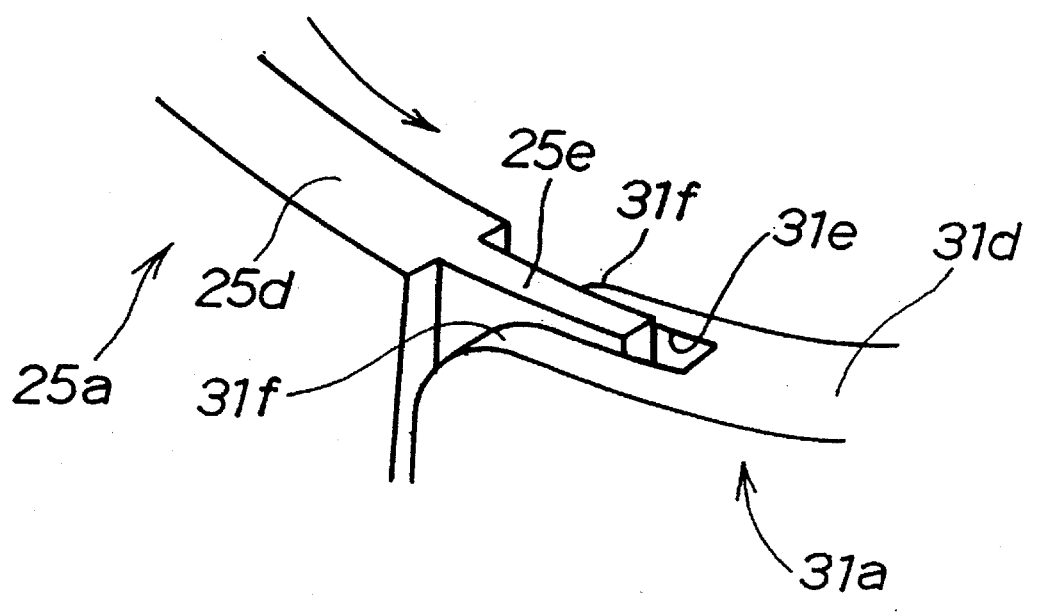
FIG. 8 is an enlarged perspective view of the integral part of FIG. 7.

A narrow guide convex 25e is provided at the lower end of the first guide plate 25 (the downstream end relative to the band insertion direction). The convex 25e protrudes downstream. On the other hand, a forked recess 31e that sandwiches the convex 25e is provided at that end of the second guide plate 31a which corresponds to the lower end of the first guide plate 25a (the upstream end relative to the band insertion direction). The convex 25e and the recess 31e are fitted with each other. FIG. 8 shows an enlarged view of the fitted part. The lateral ends 31f, 31f of the recess 31e are formed like arcs so that the inserted tip of the band (D) will not be caught by the upper end of the second guide plate 31a in the progress direction of the band when the band enters from the direction shown by the arrow. The inserted tip of the band (D) is guided over the convex 25e while sliding, and advances over the recess 31e of the second guide plate 31 and then over the surface 31d.

The guide convex 25e fitted with the recess 31e thus extends downstream relative to the insertion direction of the band (D) shown by the arrow. The surface of the convex 25e of the guide surface 25d protrudes slightly above the surface 31d located on both sides of the recess 31e.

The matching ends of the guide plates 25a, 31a are fitted in this manner. The convex 25e is located upstream relative to the insertion direction of the band (D), while the recess 31e is located downstream relative to the insertion direction of the band (D). The other guide plates are similarly configured.

That is, a guide convex 31g protrudes from the downstream end of the second guide plate 31a, while a recess 32e fitted with the guide convex is formed at the upstream end of the third guide plate 32a. The ends 32f, 32f of the surface 32d located on both sides of the recess 32e are formed like arcs as described above. A convex 32g is provided at the downstream end of the third guide plate 32a, while a recess 21e is formed at the upstream end of the fourth guide plate 21d, and these ends are fitted with each other as described above. The ends 21f located on both sides of the recess 21e are formed like arcs as described above.

FIGS. 7 and 8 show the above configuration in detail. A continuous approximately round shape is formed by the surfaces 25d, 31d, 32d, 21d of the guide plates 25a, 31a, 32a, 21a when the recesses 31e, 32e, 21e and convexes 25e, 31g, 32g are fitted with each other.

The band is inserted and fed when such a continuous approximate round is formed. Since the opposite ends of the guide plates 25a, 31a, 32a, 21a are fitted with each other, the tip of the band (D) is not caught by the joints but advances smoothly when inserted and allowed to advance.

As a result, although the clamping structure comprises four different pieces as described above, the band (D) can be continuously inserted, allowed to advance, and guided when wound around the circumference of the boot (B). Consequently, the band (D) can be smoothly and reliably inserted, allowed to travel along the guide surfaces, and wound around the boot (B).

Figure 9:
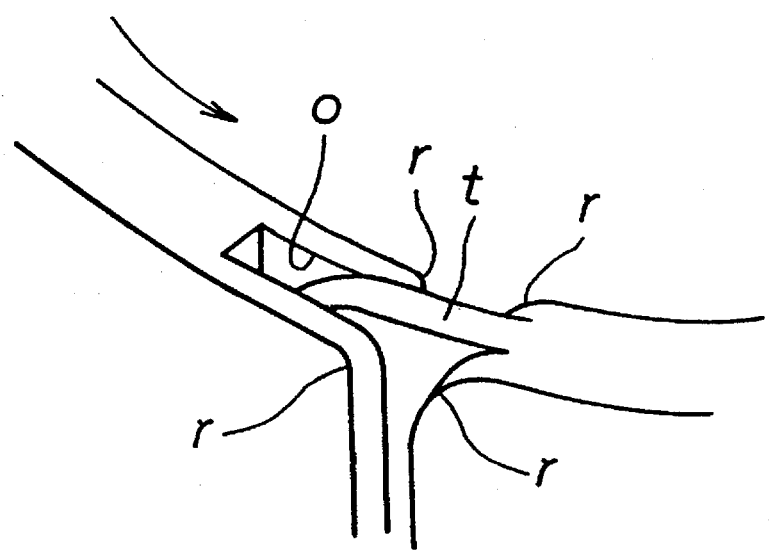
FIG. 9 is an enlarged perspective view of the integral part of an alternative structure provided for comparison to the structure in FIG. 8.

As shown in FIG. 9, a comparative configuration includes a recess (o) was located upstream relative to the insertion direction of the band (D), a convex (t) was located downstream relative to the same direction, and arc (r) was formed on both sides of the recess (o).

In this case, when the tip of the band (D) passes over both sides of the recess (o), the position of the band may become slightly unstable after the band rides onto the convex (t), resulting in inappropriate feeding of the band (D). It is thus optimum to locate the convex at the upstream end of each guide plate and the recess at the downstream end thereof.

Shoulders 25h, 21h are provided at the respective lower ends of the first guide plate 25a and the fourth guide plate 21a near the outside, while abutting sections 31h, 32h corresponding to the shoulders are formed in the second and the third guide plates 31a, 32a. When the clamping members 25, 31, 32, 21 are closed, the shoulders 25h, 21h abut and engage with the abutting sections 31h, 32h, respectively.

Figure 4:
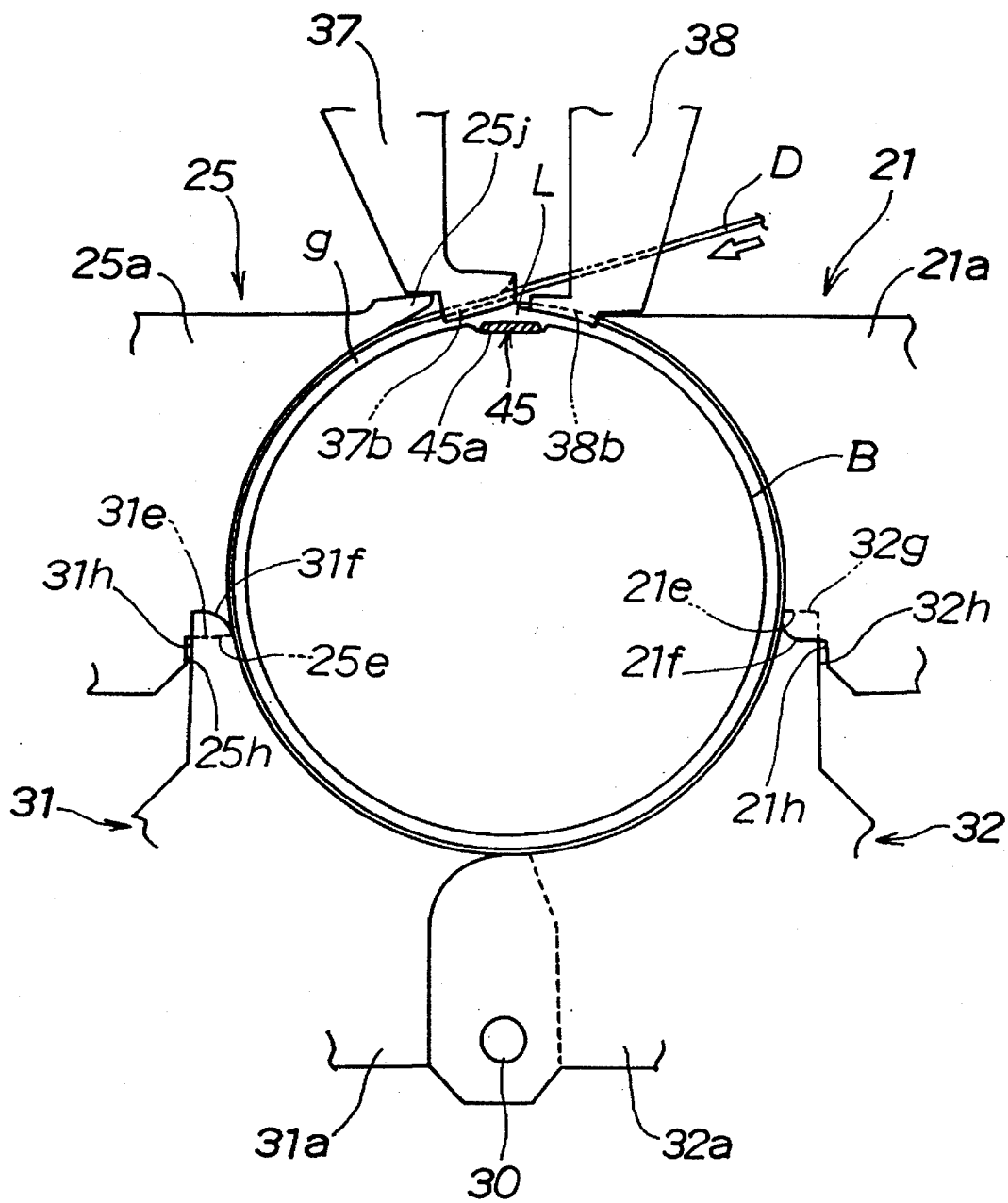
FIG. 4 is a partial view of FIG. 2, and depicts the insertion of the band into the gap between the clamping members and the boot.
Figure 5:
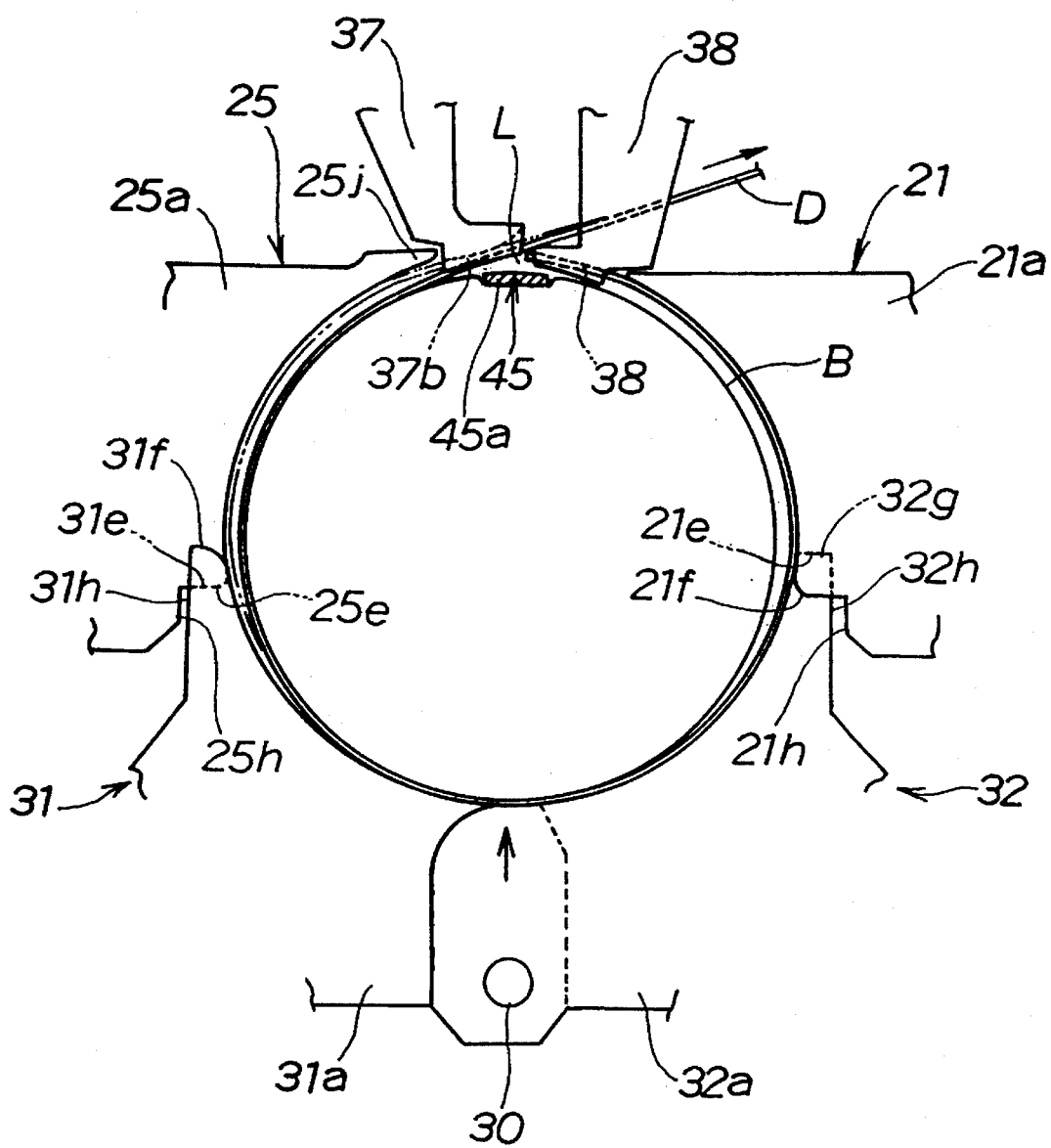
FIG. 5 depicts the pressing of the lower end of the band after the operation in FIG. 4.

That is, when the second and the third clamping members 31, 32 oscillate and all the clamping members 25, 31, 32, 21 surround the boot (B), the shoulders 25h, 21h are separated from the abutting sections 31h, 32h, as shown in FIGS. 4 and 5. When the first and the fourth clamping members 25, 21 advance, the shoulders 25h, 21h abut and press the abutting sections 31h, 32h.

Band guides 37, 38 are provided between the first clamping member 25 and the fourth clamping member 21.

Figure 10:
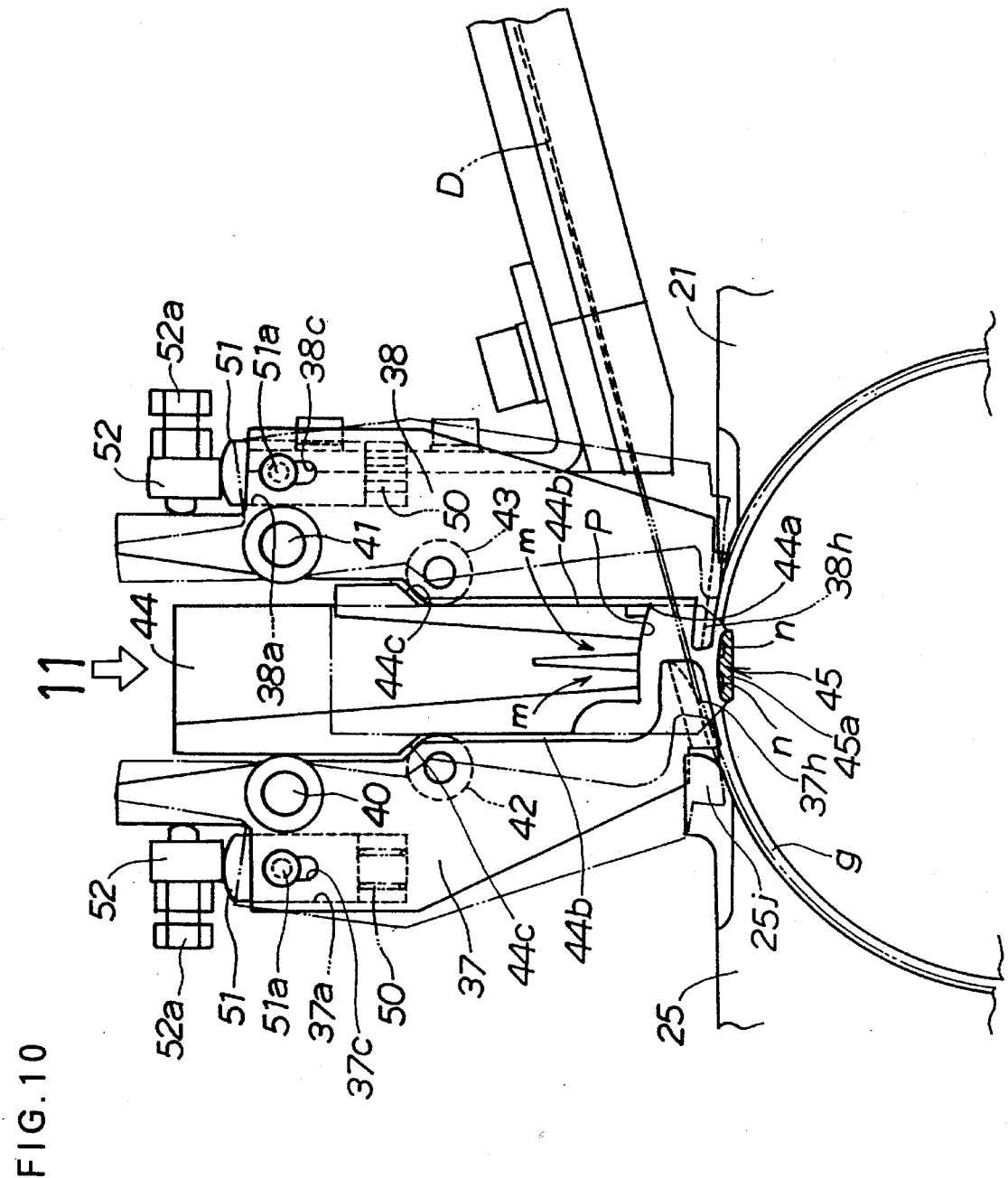
FIG. 10 is an enlarged view of the integral part of FIG. 2, and shows a band insertion guide, a mechanism for pressing and welding the overlapping part of the band, and a band cutter mechanism.
Figure 11:
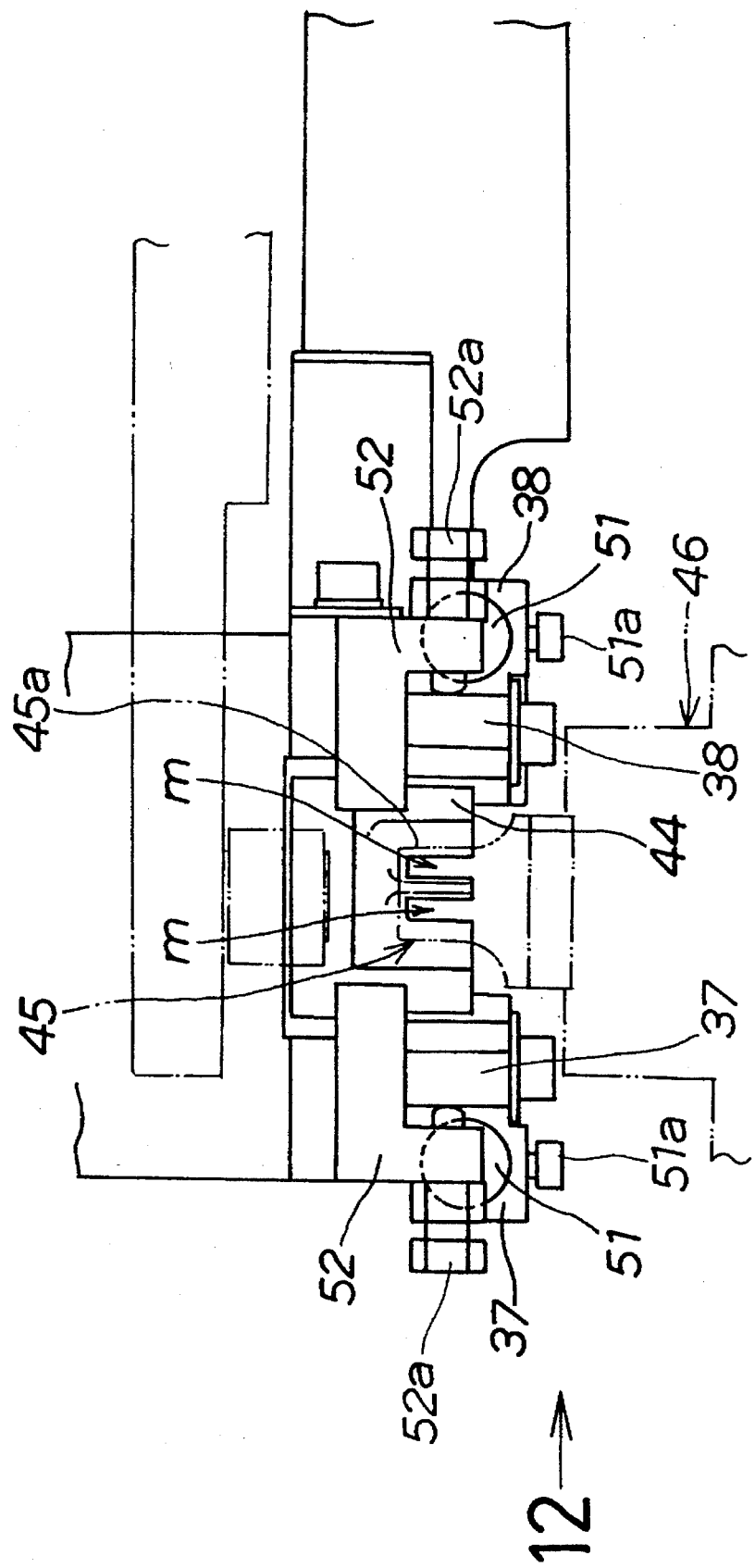
FIG. 11 is a different representation of FIG. 10 as viewed from the direction shown by arrow 11.

The band guides 37, 38 are shown in FIGS. 2 and 10.

The band guides 37, 38 are laterally spaced, have approximately symmetric shapes, and have their upper inner parts supported by shafts 40, 41, respectively, in such a way that they can oscillate. Groove 37b, 38b see FIGS. 4 and 5 for guiding the inserted band (D) are provided on the lower surfaces of the band guides 37, 38, respectively. On the other hand, rollers 42, 43 are supported via shafts by the opposite surfaces of the band guides in the middle of the height direction. At least one of the band guides 38 is L-shaped as viewed from the end, and is configured to avoid contacting the band (D) so as not to interfere with the band (D) as fed and passing therethrough.

A vertical hole 37a, 38a is provided in the upper part of each of the band guides 37, 38 so as to be separated from the shafts 40, 41. A piston 51, 51 is slidably fitted into each hole 37a, 38a. A spring 50, 50 is contracted and installed between the lower surface of the piston 51, 51 and the inner bottom of the each hole 37a, 38a. A regulating pin 51a is installed on the piston 51, 51 to engage with a regulating long hole 37c, 38c constructed on the front surface of each band guide 37, 38 to regulate the pressure of the spring 50, 50 and sliding stroke. A stopper 52, 52 is installed on each piston 51, 51. The band guides 37, 38 are symmetrically pressed inward by allowing the stoppers 52, 52 to abut the top of the pistons 51, 51. Each stopper 52, 52 has an adjustment screw 52a, 52a abutting the outer surface of the upward protruding section of the corresponding band guide 37, 38 to adjust the amount of lateral closing of the band guide 37, 38.

Figure 12:
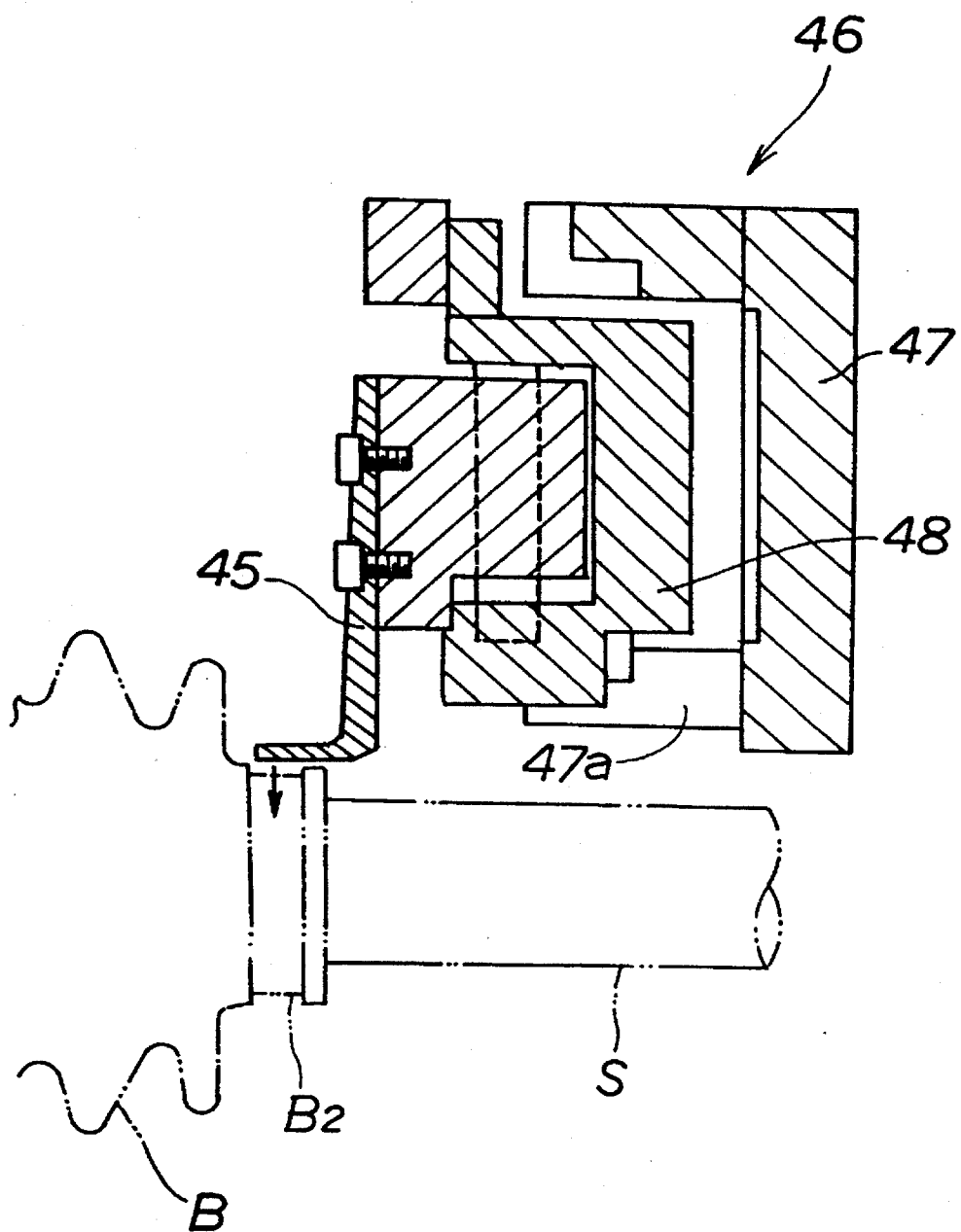
FIG. 12 is a different representation of FIG. 11 as viewed from the direction shown by arrow 12, that is, a cross section of a back bar inserted between the boot and the band.
Figure 13:
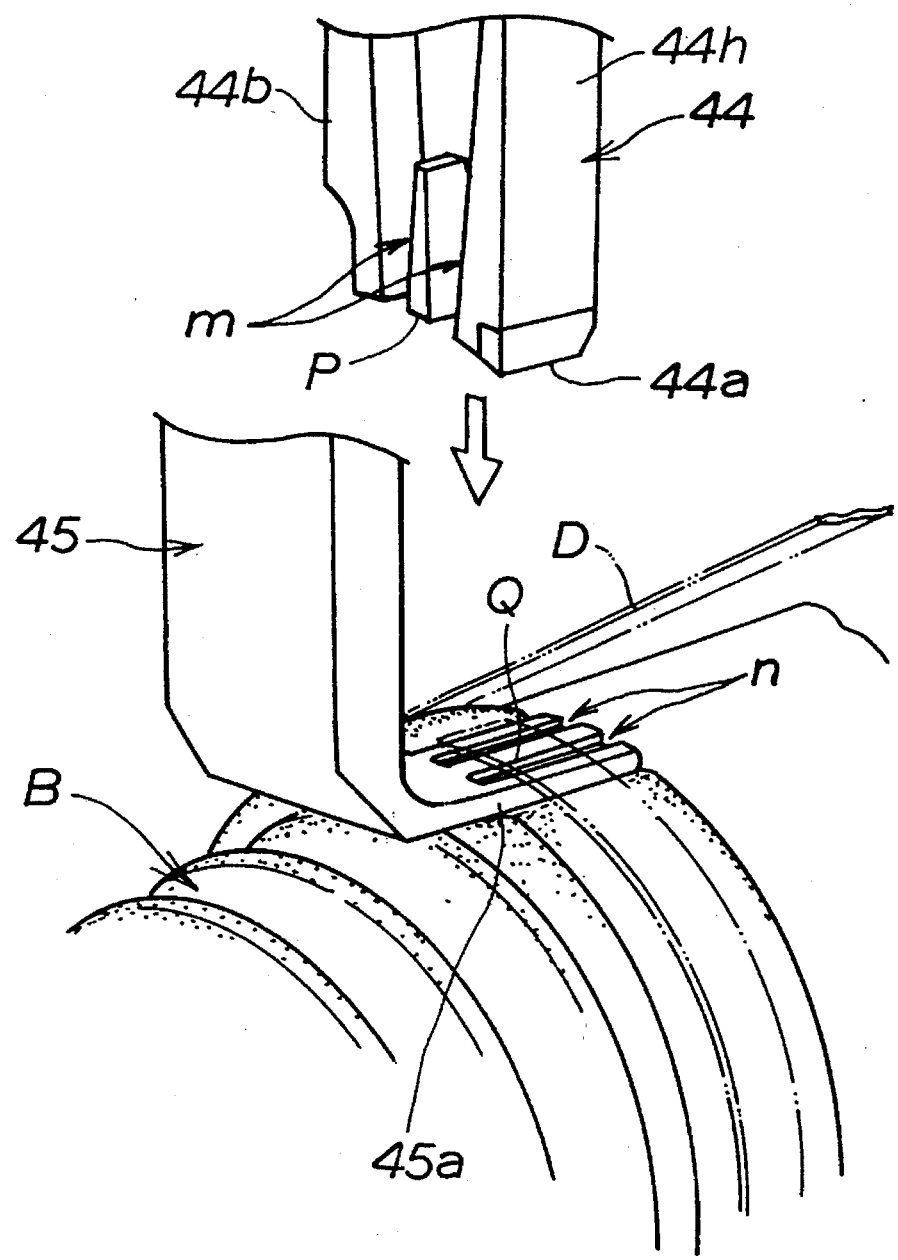
FIG. 13 a partially enlarged perspective view describing the insertion of the back bar between the boot and the band and the subsequent lowering of a clamp and cutter.

An elevating clamp and cutter 44 is installed in the middle of the band guides 37, 38. A cutting blade 44a is installed at the lower end of the clamp and cutter 44 located downstream relative to the insertion direction of the band (D). A cam surface 44b, 44b with a symmetric shape is provided on both sides of the clamp and cutter 44. When the clamp and cutter 44 is lowered, the band guides 37, 38 are guided by the cam surfaces 44b, 44b and opened outward against the springs 50, 50 because the rollers 42, 43 engage with the cam surface 44b, 44b. When the clamp and cutter 44 is elevated, the band guides 37, 38 are oscillated and closed to allow the band to be inserted. In addition, the clamp and cutter 44 has two grooves (m), (m) through which laser beams are radiated downward. A laser beam irradiation device is installed above the clamp and cutter 44 to radiate laser welding beams downward. Below the clamp and cutter 44 is installed a back bar 45 for pressing and positioning that part of the boot which is located between the first and the fourth clamping members 25, 21. The back bar 45 is clearly shown in FIGS. 2, 10, 12, and 13. The back bar 45 is installed, as shown in FIG. 12, on a back bar device 46 including a supporting bracket 47. A slider 48 that can move in the axial direction of the shaft (S) is provided along the guide 47a of the supporting bracket. The bracket 47 can move vertically. The back bar is attached to the front surface of the slider 48. The back bar 45 includes a pressing section 45a bent like the alphabet "L" in a direction perpendicular to the sheet of drawing in FIGS. 2 and 10, the shape of which is clearly shown in FIG. 13. The back bar 45 is used to prevent the boot (B) from being thermally affected when the overlapping part of the band (D) wound around the boot (B) is welded. The overlapping part of the band (D) is thus formed on the pressing section 45a of the back bar 45. That is, before inserting the band (D) into a gap (g) shown in FIGS. 4 and 10 and winding it around the boot (B), the pressing section 45a of the back bar 45 is located on the upper surface of the boot (B), and the boot (B) is pressed downward so as to form an overlapping part ($D_1$) of the band (D) on the upper surface of the pressing section 45a.

Two recesses (n), (n) corresponding to sites to which laser beams are applied are formed on the upper surface of the pressing section 45a of the back bar 45.

Figure 14:
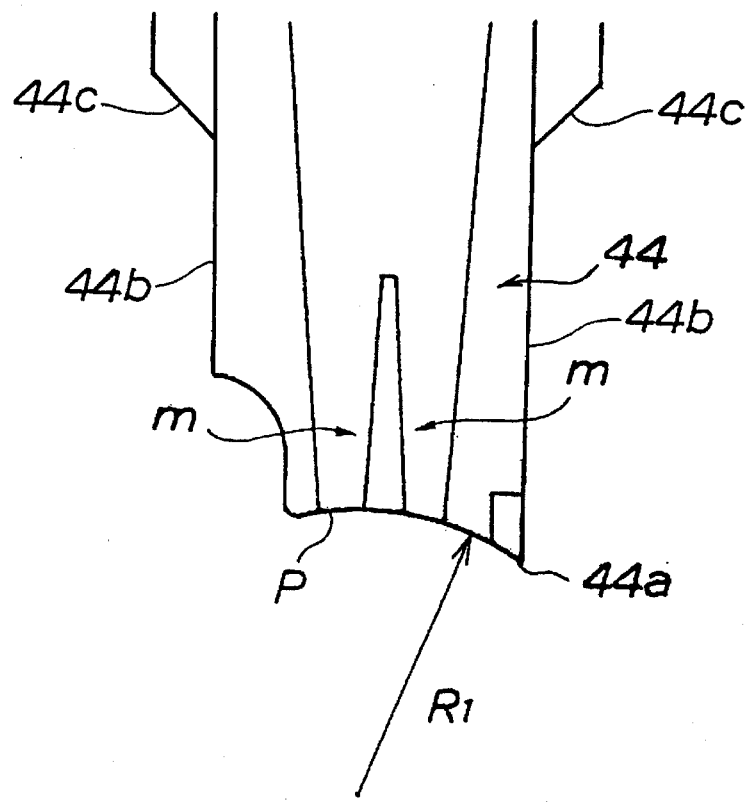
FIG. 14 is an enlarged view of the tip of the clamp and cutter.
Figure 15:
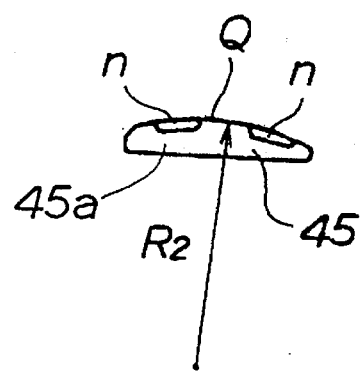
FIG. 15 is an end view of the back bar as viewed from the same direction as in FIG. 14, and shows the correspondence of the back bar and the clamp and cutter.
Figure 16:
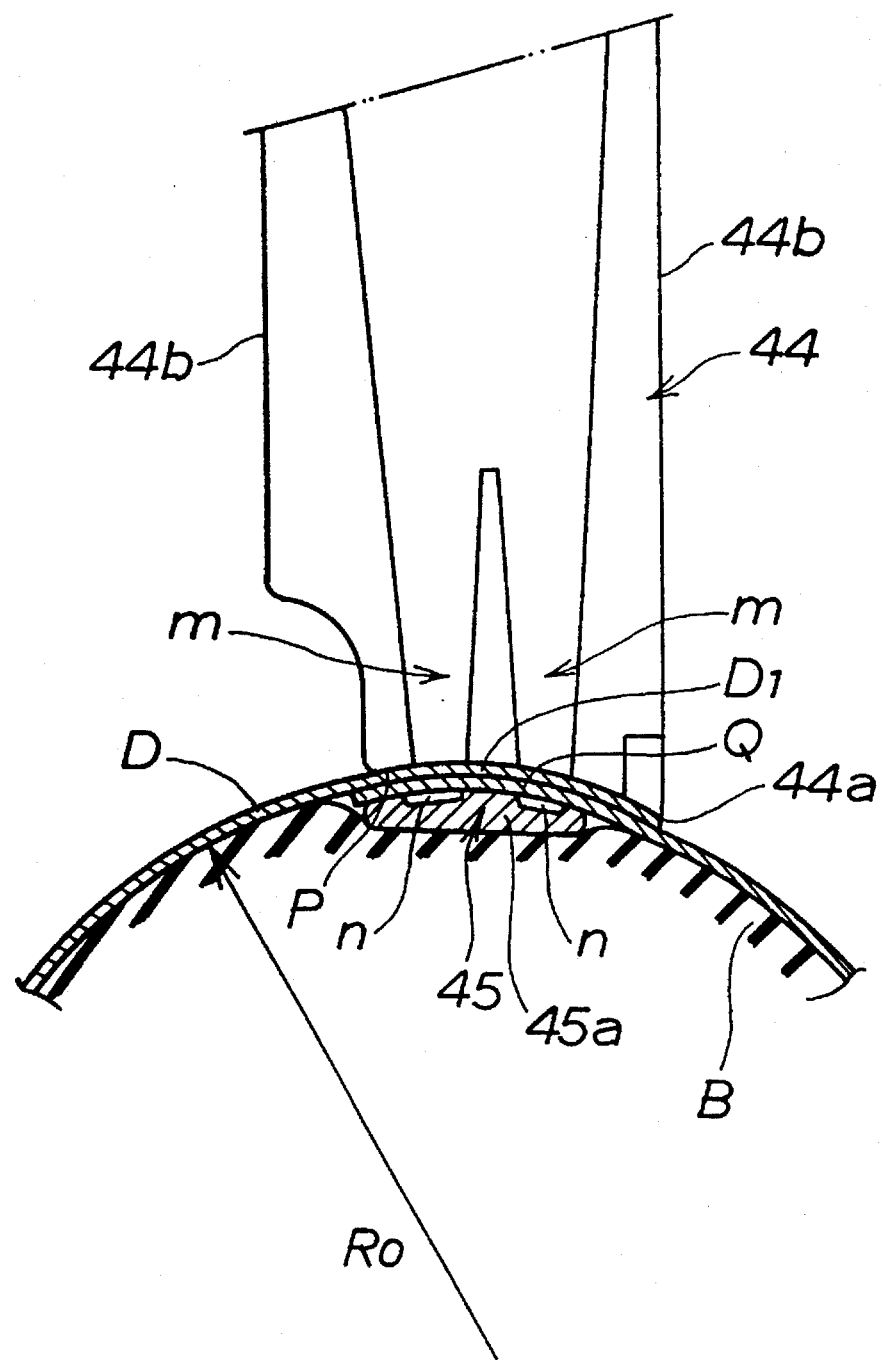
FIG. 16 is an enlarged cross section of the integral part of the clamp and cutter and the back bar which are used to press the overlapping part of the band.

The lower surface of the clamp and cutter 44 that contacts the band (D) is formed as a pressing surface (P) for pressing the overlapping part ($D_1$). On the other hand, the corresponding upper surface of the pressing section 45a of the back bar 45 is formed as a receiving surface (Q) for receiving the overlapping part of the band (D). Curvature is formed on both the pressing surface (P) and the receiving surface (Q), as shown in FIGS. 14 and 15. The curvature $R_1$ of the pressing surface (P) and the curvature $R_2$ of the receiving surface (Q) are each set to a value smaller than the curvature $R_0$ of the outer diameter of a workpiece when the band (D) is clamped by the first to fourth clamping members 25, 31, 32, 21. When the clamp and cutter 44 presses the overlapping part ($D_1$), the cutting blade 44a must be located outside the end of the pressing section 45a of the back bar 45 so that the tip of the cutting blade 44a can cut into the outer circumference of the workpiece.

Figure 17:
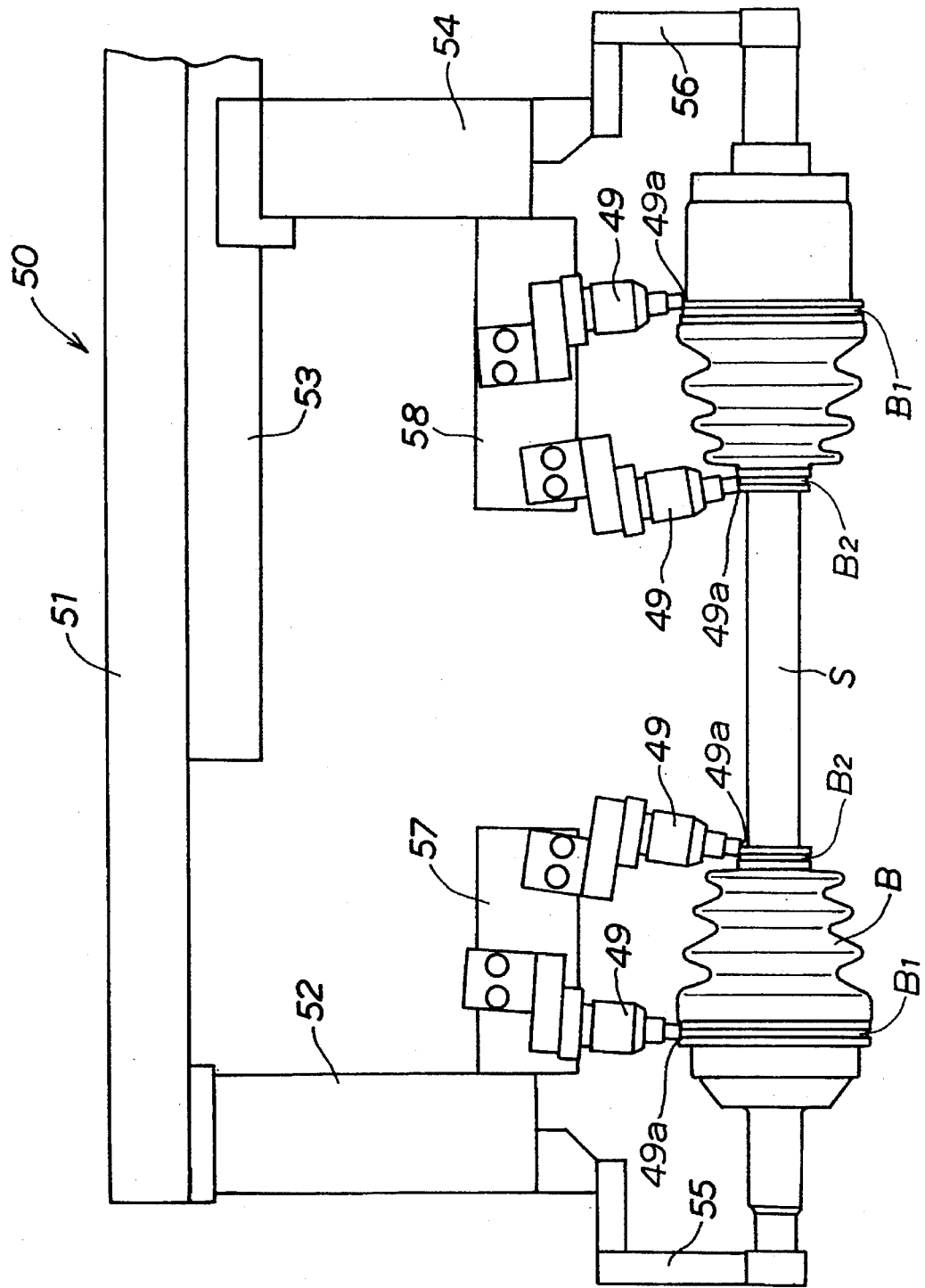
FIG. 17 is a general view of an application device for applying lubricating oil to the clamped part of the band.

The fixation section 3 of the apparatus for winding and fixing a band according to this invention has a lubricating oil application device 50 installed adjacent thereto, as shown in FIG. 17. The device 50 comprises a horizontal frame 51 having a trailing arm 52 and a rail 53 installed on the frame 51 and to which a trailing arm 54 is movably attached. Each of the arms 52, 54 has at its lower end a finger 55, 56 retaining an end of the drive shaft (S) and trailing downward. Each arm 52, 54 has a supporting block 57, 58 that can be elevated. Lubricating oil applicators are attached to and retained by the blocks 57, 58.

Figure 18:
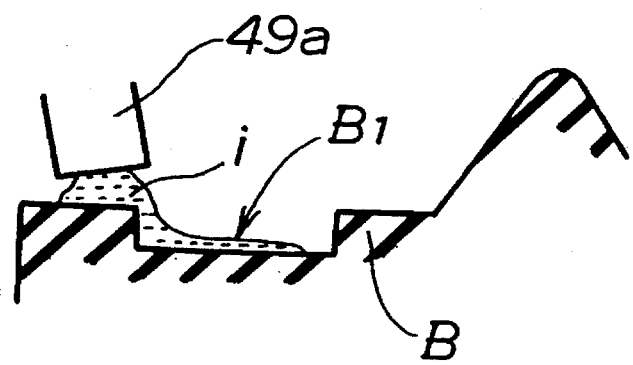
FIG. 18 is an enlarged cross section of a part to which lubricating oil is applied, and depicts the application of lubricating oil to that part of the boot to which the band is wound and fixed.

As shown, both ends of the drive shaft (S) are retained by the fingers 55, 56 in such a way that the application nozzle 49a of the applicator 49 meets the clamped and fixed part of the boot (B) covering the section between the joint and the shaft (S) at both axial ends. Lubricating oil (i) is then applied from the application nozzle 49a to a band winding groove ($B_1$) of the boot (B), as shown in FIG. 18. Although FIG. 18 shows the application of lubricating oil (i) to the band winding groove ($B_1$), the same operation can be performed for the other grooves ($B_2$).

In this manner, lubricating oil is applied to at least the site pressed by the pressing section 45a of the back bar 45 or the neighborhood thereof before a band winding and fixation process. Although the application device including four applicators 49 is shown, a plurality of applicators are not necessarily required and a single applicator may be used to sequentially apply lubricating oil to each site.

Under the overlapping part ($D_1$) of the band (D), the pressing section 45a of the back bar 45 is subjected to local recess-like deformation, that is, pressed to cut into part of the boot (B). When laser welding is applied to the overlapping part ($D_1$) of the band (D), the pressing section 45a of the back bar 45 is heated as well as pressed downward. Large sliding resistance is thus effected when the pressing section 45a of the back bar 45 is pulled out of the pressed part of the boot (B) after welding.

This sliding resistance can be reduced, however, because lubricating oil has been applied to the surface of the relevant part of the boot (B) and is thus present between this surface and the lower surface of the pressing section 45a. The pressing section 45a of the back bar 45 can be pulled out easily and smoothly to reliably prevent inconveniences such as biased elongation of this part of the boot (B) and a scratch thereon.

Next, the band (D) winding and fixation operation by the apparatus for winding and fixing a band 1 is described.

Before winding and fixing the band (D), lubricating oil is applied from the applicator 49 of the lubricating oil application device 50 to that site of the boot (B) to which the band is wound and fixed.

First, the cylinder unit 11 shown in FIG. 1 is driven to cause the rod 11c to extend, thereby oscillating the oscillating arm 13 clockwise in the figure. As a result, the second and the third clamping members 31, 32 oscillate and rise upwardly to the left together with the third pusher 27 as shown by the arrow. By this time, the transfer table 33 has transferred the shaft (S) to a location below the fixation section 3 and raised the retaining equipment 34 to set it in position.

When the cylinder unit 11 is driven as described above, the clamping members 25, 31, 32, 21 surround the boot (B) on the shaft (S). This state is shown in FIG. 2. At this point, the inner surfaces 25d, 31d, 32d, 21d of the guide plates 25a, 31a, 32a, 21a form an approximately round shape, as described above, and the gap (g) is formed between the inner surfaces 25d, 31d, 32d, 21d and the outer circumferential surface of the boot (B). The back bar 45 subsequently moves to an area above the boot (B), lowers, and is positioned while pressing the top of the boot (B) with its pressing section 45a.

On the other hand, the band (D) is withdrawn from the reel 4 and supplied to the fixation section 3 via the group of rollers 7, 6, 5, 8 in the supply section 2. The tip of the supplied band (D) is guided into the groove 37b on the lower surface of the band guide 37 and fed into the gap (g). The band (D) advances along the inner surface 25d of the guide plate 25a of the first clamping member 25. It subsequently advances along the inner surfaces 31d, 32d, 21a of the guide plates 31a, 32a, 21a in this order. The lower surface of the band guide 38 is located above the fourth guide plate 21a; and after passing through the groove 38b on this surface, the tip of the band (D) overlaps its other end on the pressing section 45a of the back bar 45. The feed of the band is determined depending upon the amount of this overlapping part.

The insertion of the band (D) and the subsequent winding thereof around the circumference of the boot (B) are carried out smoothly because the inner surfaces 25d, 31d, 32d, 21d form an approximately round shape. The inner surfaces 25d, 31d, 32d, 21d comprise four separate blocks, and the guide plates 25a, 31a, 32a, 21a constituting these blocks engage with each other using the convexes and recesses as described above. In addition, the convexes 25e, 31g, 32g are provided with the upstream clamping members relative to the insertion and advancing direction of the band (D) so as to protrude downstream, whereas the recesses 31e, 32e, 21e are provided in the downstream clamping members so as to receive the convexes, as described above. Thus, the tip of the band (D) is not caught by the joints of the guide plates 25a, 31a, 32a, 21a, as described above. The combination of this aspect and the smooth guidance due to the approximately round shape formed by the inner surfaces of the guide plates enables the band to be inserted and fed smoothly and reliably without being caught by the joints.

The width direction of both sides of the band (D) travelling along the inner surfaces 25d, 31d, 32d, 21d of the guide plates is controlled by the side plates 25b, 31b, 32b, 21b. The band (D) is thus inserted, guided, and fed smoothly and reliably along the inner surfaces of the guide plates without moving in the width direction.

The band (D) is clamped after the Winding operation is finished. The clamping operation is as follows.

The cam 15 shown in FIG. 1 is driven and rotated to thrust up the third pusher 27 via the roller 18, thereby moving the second and the third clamping members 31, 32 upward as shown in FIG. 5. This causes the lower ends of the inner surfaces 31d, 32d of the clamping members 31, 32 to press the lowest end of the band (D) against the boot (B). When the lowest end of the band (D) is pressed against the boot (B) and retained thereon, a reverse force is applied to the band (D) on the insertion side. As a result, the band (D) on the insertion side is guided by the groove 38b on the lower surface of the band guide 38 located above the inner surface 21d of the guide plate of the fourth clamping member 21 to move toward the first clamping member 25, resulting in removal of the looseness of the band (D) on the insertion side.

The cam 15 is then further rotated. As a result, the roller 16 moves the first pusher 20 to the left in FIG. 2. In addition, since the slider 22 moves to the right in FIG. 1 via the roller 17, the second pusher 23 engaging with the end 22a of the slider 22 via the roller 24 moves to the right in FIG. 2. That is, the pushers 20, 23 symmetrically move inward. Since the pushers 20, 23 have the first and the fourth clamping members 25, 21 attached thereto, respectively, as described above, these clamping members 25, 21 each move inward.

During this movement, the shoulders 25h, 21h of the first and the fourth clamping members 25, 21 abut the abutting sections 31h, 32h of the second and the third clamping members 31, 32 to press them inward. As a result, the second and the third clamping members 31, 32 oscillate and tilt about the circumference of the shaft 30 to apply an upward clamping force thereto. This causes the looseness of the band (D) to be fed to the upper opening section, enabling clamping without looseness.

At this point, although the side plates 25b, 31b, 32b, 21b of the first to the fourth clamping members 25, 31, 32, 21 are pressed toward the surface of the boot (B), they retreat under the action of the springs 35. The side plates 25b, 31b, 32b, 21b retreat radially against the springs 35 until their edges become flush with the inner surfaces 25d, 31d, 32d, 21d of the guide plates 25a, 31a, 32a, 21a located inside the side plates. This prevents the pressure on the band (D) from being reduced.

Before the above operation, the pressing section 45a of the back bar 45 is placed in the gap between the first and the fourth clamping members 25, 21, and then lowered to press the upper end of the boot (B). The pressing section 45a presses and deforms the upper end of the boot (B) downward so that the surface of the pressing section 45a protrudes slightly above the surface of the boot (B) or rests at approximately the same level as the latter surface as shown in FIG. 5.

The upstream end of the band (D) moves until it overlaps its downstream end on the surface of the pressing section 45a of the back bar 45. The tip site of the band (D) is thus wrapped around part of the downstream side.

After the back bar 45 has been set and the band (D) is wound around the boot, the band (D) is cut off and the overlapping part is welded.

This operation is described below.

After the operation shown in FIGS. 2 and 10, the clamp and cutter 44 is lowered onto the wrapped part of the band (D). The lowering of the clamp and cutter 44 causes the intermediate tilted stages 44c, 44c on the lateral cam surfaces 44a, 44a to engage with the rollers 42, 43 of the band guides 37, 38 and to oscillate the band guides in the 5 direction in which they are opened. Consequently, the lower parts of the band guides 37, 38 oscillate outward and downward to form a gap that enables the clamp and cutter 44 to be lowered. The grooves 37b, 38b on the lower surfaces press the wrapped part of the band downward to form the overlapping part ($D_1$) of the band (D) on the back bar 45.

In addition, when the clamp and cutter 44 lowered, its lower end enters the gap between the lower ends of the band guides 37 and 38, and its lower passing surface (p) presses and retains the overlapping part of the band ($D_1$). The lowering of the clamp and cutter 44 also causes the cutting blade 44a to meet and cut the upper upstream end of the overlapping part($D_l$) of the band (D) shown in FIG. 6.

FIG. 6 shows the conditions after cutting.

A laser beam irradiation device (not shown) is then used to irradiate the overlapping part with laser beams through the clamp and cutter 44. Laser beams travel through vertical grooves (m), (m) of the clamp and cutter 44 onto the overlapping part ($D_1$) to weld it.

In this case, the pressing section 45a of the back bar 45 is located under the overlapping part ($D_1$), and radiated laser beams are received by the receiving grooves (n), (n) therein. The site of the boot (B) under the overlapping part ($D_1$) that is welded is prevented from being thermally affected during welding because of the presence of the pressing section 45a of the back bar 45 on the site, as described above.

After welding, the back bar 45 is axially moved to remove the pressing section 45a from between the lower surface of the overlapping part ($D_1$) and the surface of the boot (B). Although the pressing section 45a may cut into part of the boot (B), the pressing section 45a can be removed smoothly and easily from between the overlapping part ($D_1$) and the boot (B) without causing sliding resistance or other inconveniences such as biased elongation of the boot (B) or a scratch thereon because lubricating oil has been applied to the relevant part of the boot (B) and the neighborhood thereof.

After the back bar 45 has been removed in this manner after welding, the clamping members 25, 31, 32, 21 are released to finish the winding and fixation of the band.

As described above, the band can be inserted and allowed to advance smoothly, reliably, and easily because the inner surfaces for guiding the band form an approximately round shape when the lateral pair of upper clamping members and the lateral pair of lower clamping members surround the boot. When the band wound around the circumference of the boot is clamped, the looseness of the band can be removed because the band is sequentially clamped from its middle to end. The clamping mechanism is simple due to its interlocking relationship wherein the lower clamping means are tilted to clamp the band when the upper clamping members are moved to clamp the band.

Since the back bar is placed between the overlapping part of the band and the boot when the overlapping part is welded, the boot is prevented from being thermally affected, resulting in firm joining of the band.

Simplification of the mechanism is also be achieved by using a single member, that is, the clamp and cutter to reliably press the overlapping part as well as to cut off the unwanted part of the band.

The outer end of the band adheres to the inner band and is prevented from being warped or torn off when a clamping force is released because the outer end of the band is located outside the back bar and because outer end of the clamping section of the clamp and cutter is allowed to cut into the initial outer circumference of the band.

The adhesion of the inner and the outer parts of the band can be improved if the curvature of the clamping section of the cutter and clamp and the curvature of the upper surface of the pressing section of the back bar are each smaller than that of the outer circumference of the band (boot).

The band can be inserted, fed, and allowed to advance smoothly, easily, and reliably without being caught along the inner surfaces because the clamping members comprise a plurality of separate pieces and the inner surfaces constituting the band guide surfaces circumferentially engage with each other using the convexes provided with the downstream part of the upstream member and the recesses provided in the downstream part of the upstream member.

In addition, since lubricating oil is applied to that part of the boot which the back bar abuts, the back bar can be removed smoothly, reliably, and easily without being damaged and without damaging the boot.

In winding and fixing a band, the number of turnings of the band around the boot must be determined, and whether or not the band has been wound around the boot without looseness must also be determined.

A determination device for evaluating the insertion, feeding, winding, and fixation of the band using the above apparatus is thus described below.

Figure 19:
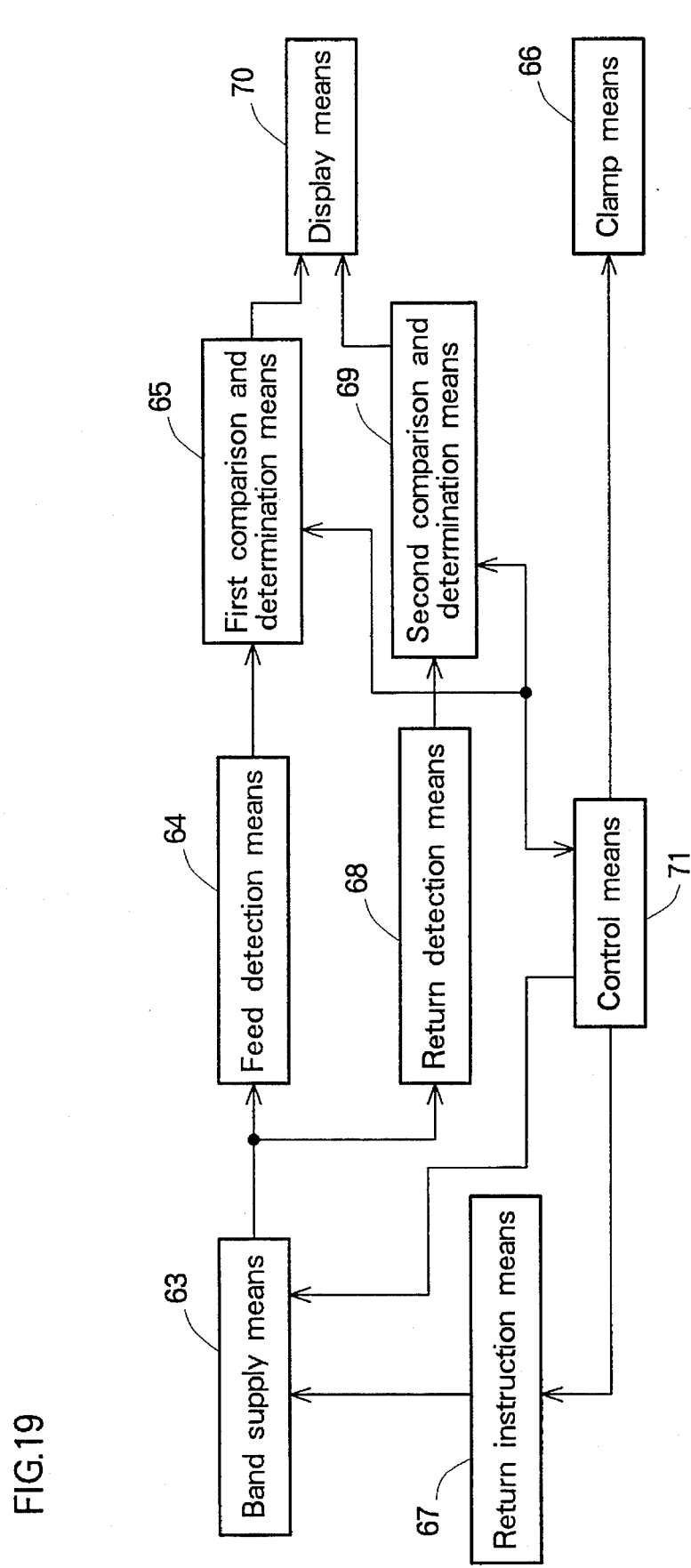
FIG. 19 is a block diagram showing a structure for providing control such as the evaluation of band feeding, insertion, and winding conditions of the method and apparatus for winding and fixing a band according to the invention.

FIG. 19 is a block diagram showing a determination device comprising a band supply means 63 corresponding to the band supply section 2, a feed detection means 64 for detecting the feed of the band fed by the roller, a first comparison and determination means 65 for comparing the actual feed of the band to a set value to make a determination, a clamp means 66 comprising the clamping members 25, 31, 32, 21 in the clamping section 3 and operating based on the results of the determination by the first comparison and determination means 65. This device further comprises a return instruction means 67 for instructing the supply means 63 to move in the reverse direction the band, a return detection means 68 for detecting the reverse movement of the band, a second comparison and determination means 69 for comparing the actual return of the band to a set value to make a determination, and a display means 70 for informing the operator of the results of the determination by the first and the second comparison and determination means 65 and 69. The device further comprises a control means 71 for controlling the other means, that is, the band supply means 63, the first comparison and determination means 65, the clamp means 66, the return instruction means 67, and the second comparison and determination means 69.

Figure 20:
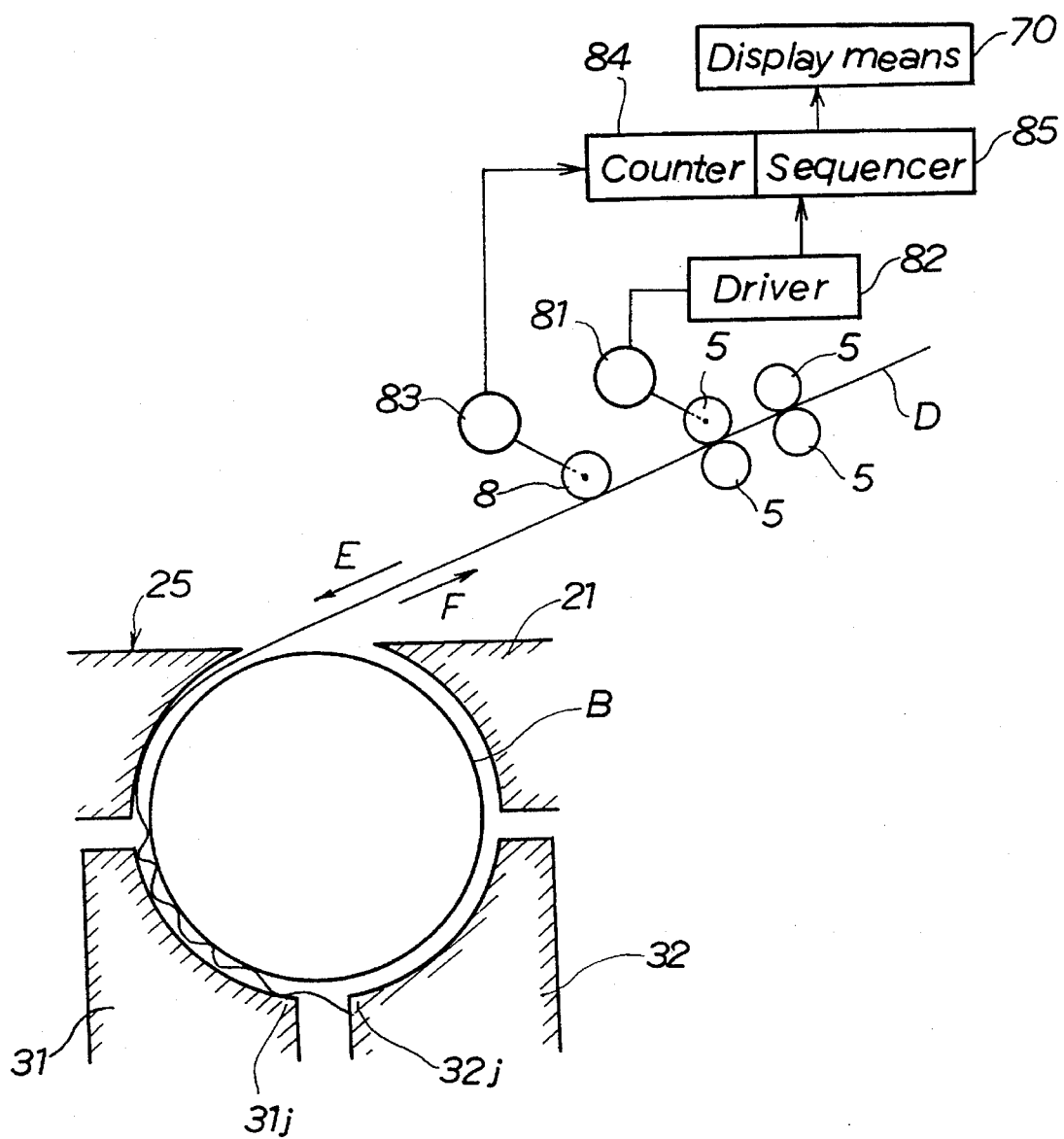
FIG. 20 schematically describes the determination of the feed or whether or not the feeding or insertion of the band is carried out properly when the band is fed, inserted, or wound.

The band supply means 63 comprises a roller 5 (pinch roller) for feeding the band (D) along the outer circumference of the boot (B), a servo motor 81 for driving and rotating the roller 5, and a driver 82 for driving the servo motor 81, as shown in FIG. 20.

As also shown in FIG. 20, the feed detection means 64 comprises a count roller 8 that rotates in response to that movement of the band (D) which is shown by arrow (E). The count roller 8 has its rotation shaft coupled to a rotary encoder 83 connected to a counter 84 for counting pulses output from the rotary encoder.

The return detection means 68 rotates the rotary encoder 83 in the reverse or opposite direction using the counter roller 8 that rotates in the reverse or direction in response to that movement of the band (D) which is shown by arrow (F).

The clamp means 66 is schematically shown in FIG. 20 and comprises the clamping members 25, 31, 32, 21.

As shown in FIG. 20, the first comparison and determination means 65, the return instruction means 67, the second comparison and determination means 69, and the control means 71 comprise a sequencer (programmable control) 85 having a storage means for temporarily storing feed and return set values set by input means in advance, the feed detected by the feed detection means 64, and the return detected by the return detection means 68.

The sequencer 85 also acts as the control means 71 to output a feed instruction signal to the band supply means 63 and to output a drive signal for opening or closing the clamping members 25, 31, 32, 21 constituting the clamp means 66. That is, the sequencer 85 outputs drive signals for the cylinder unit 11 and the cam 15.

The display means 70 comprises an indicator and a speaker (not shown) to provide visual and audio information to the operator. The display means 70 is configured to output the results of the determination by the first and the second comparison and determination means 65 and 69.

Figure 21:
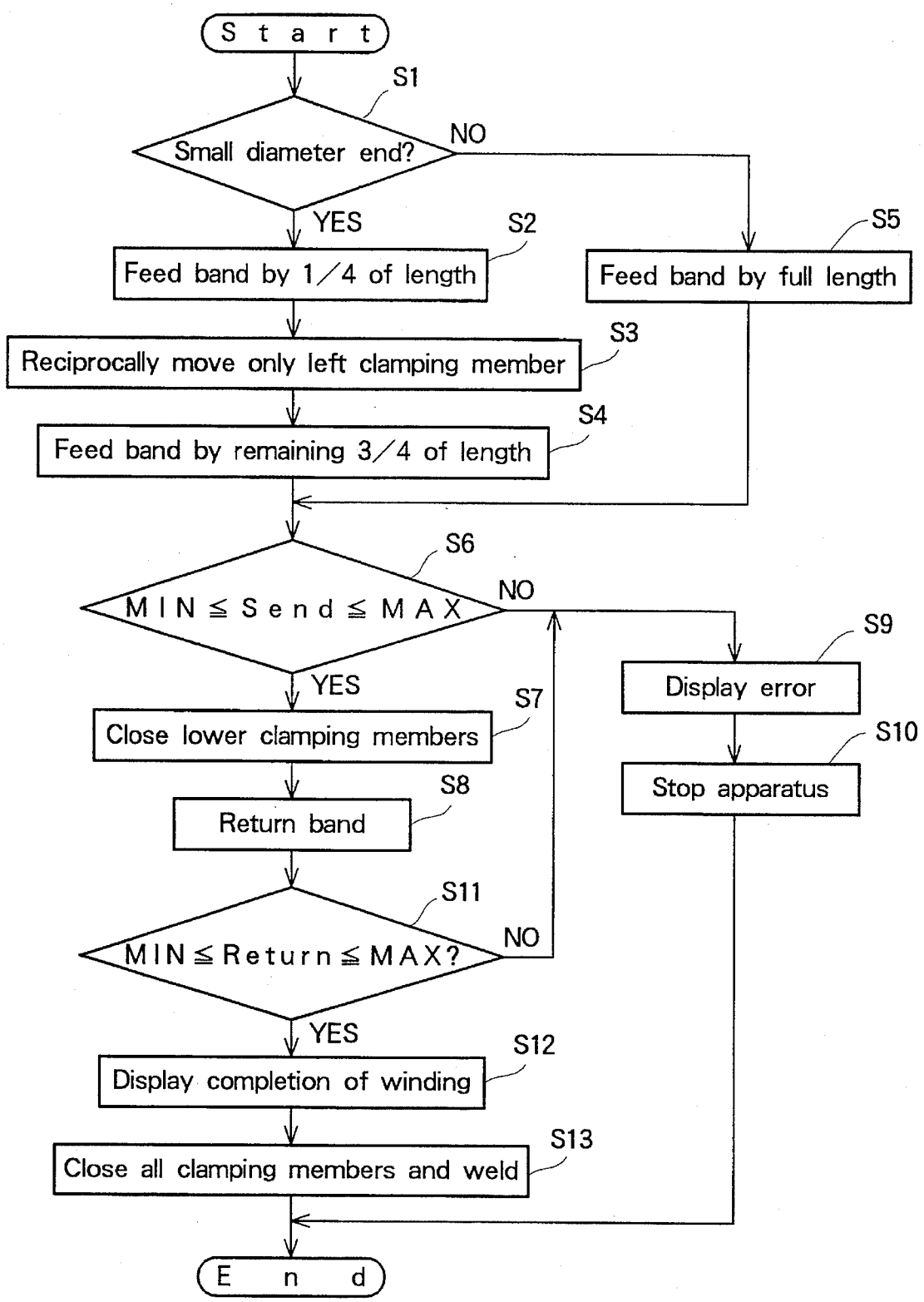
FIG. 21 is a flowchart of the controlling process in FIG. 20.

The operation of the determination device is described with reference to the flowchart in FIG. 21.

As shown in FIG. 22, the band (D) is wound around both the large diameter end ($B_1$) and the small diameter end ($B_2$) of the boot (B). In this embodiment, the winding of the band around the small diameter end is described.

First, the control means 71 determines whether or not the band is to be wound around the small diameter end ($B_2$)

(step S1). If so, the band supply means 63 feeds the band (D) into the gap between the outer circumference of the boot (B) and the clamping member 25 shown on the left of FIG. 20 by one fourth of a feed set value for the small diameter end, with the feed detected by the feed detection means 64 (step S2).

If the control means determines that the band is not to be wound around the small diameter end ($B_2$) but around the large diameter end ($B_1$), it feeds the band by the full feed set value for the large diameter end ($B_1$) (step S5).

In the case of the small diameter end ($B_2$), only the left clamping member 25 is moved reciprocally (the reciprocal movement is set by the cam surface of the cam 15) (step S3). The left clamping member (the first clamping member) is moved reciprocally only in the case of the small diameter end ($B_2$) because if the tip of the band (D) is not bent in accordance with the outer circumference of the boot (B), the small curvature of the small diameter end ($B_2$) may cause the band to be caught on one of the inner surfaces of the clamping members 25, 31, 32, 21 which also act as guides, preventing the band from travelling around the outer circumference of the boot easily when the band (D) is fed.

In the case of the large diameter end ($B_1$), however, since the curvature is relatively large, the band (D) can be fed without bending, and the band can be fed by the full feed set value at a time without the reciprocal movement of the left clamping member 25.

After the reciprocal movement of the left clamping member 25 only, the band supply means 63 feeds the remaining band (three fourths of the feed set value), with its feed detected by the feed detection means 64 (step S4).

At step S6, the first comparison and determination means 65 determines whether or not the feed to the large diameter end ($B_1$) or the small diameter end ($B_2$) detected by the feed detection means 64 is within a specified range. If so, only the lower ends 31j, 32j of the lower clamping members 31, 32 press the boot (B) as part of the clamping operation of the lower clamping members, as shown in FIG. 20 (step S7).

On the other hand, if the first comparison and determination means determines that the feed is out of the specified range, the display means 70 indicates an error (step S9) to allow the operator to stop the boot winding and fixing device (step S10).

After only the lower ends 31j, 32j of the lower clamping members 31, 32 press the boot (B), the feed roller in the band supply means 63 is rotated in the reverse direction to return the band in the direction reverse to the feed direction and shown by arrow (F), with the return detected by the return detection means 68 (step S8).

At step S11, the second comparison and determination means 69 determines whether or not the return from the large diameter end ($B_1$) or the small diameter end ($B_2$) detected by the return detection means 68 is within a specified range. If so, the display means 70 indicates that rewinding is completed (step S12).

On the other hand, if the second comparison and determination means determines that the return is out of the specified range, the display means 70 indicates an error (step S9) to allow the operator to stop the boot rewinding and fixing device (step S10).

If it is determined that the return is within the specified range, the lower clamping members 31, 32 are closed and the lateral pair of upper clamping members 25, 21 are also closed with the lower ends 31j, 32j of the lower clamping members 31, 32 pressed against the boot (B). The overlapping part of the band is then welded, and the band is cut off (step S13) as described above.

When the band is cut off, the operation for winding the band (D) around the boot (B) and fixing it thereto is finished.

Assume that after the band has been fed using the above configuration and procedure, the tip of the band (D) is caught by the end 32j of the lower clamping member 32 and loosened between the boot (B) and the left clamping member 25 and between the boot (B) and the clamping member 31 located below the clamping member 25 as the band (D) is continuously fed as shown in FIG. 20. In this case, the band (D) returning operation can be used to determine that the return is out of the specified range.

If the tip of the band (D) has not passed through the lower ends 31j, 32j of the lower clamping members 31, 32, the band (D) returning operation can be used to determine that the band has slipped out of the circumference of the boot (B) and that the return is out of the specified range.

In this manner, it can be determined promptly whether or not the winding of the band (D) around the boot (B) has been executed properly. Consequently, the clamping operation of the clamping members 25, 31, 32, 21 or welding is not performed if the band (D) is wound around the boot (B) inappropriately, thereby enabling required action to be taken promptly.

As described above, it can be determined reliably that the band is properly wound around the boot. Clamping without looseness can be achieved and clamping or welding is not executed unless the band is wound around the boot properly, resulting in improved productivity.

Although there has been described what is at present considered to be the preferred embodiment of the invention, it will be understood that modifications and variations may be made thereto without departing from the spirit and essence of the invention. The scope of the invention is indicated by the appended claims.

We claim:

1. A method for winding and fixing a band comprising the steps of:

using a lateral pair of upper clamping members and a lateral pair of lower clamping an members to surround a boot;

forming a gap between an inner surface of each of the clamping members and outer circumference of the boot;

inserting a band into the gap;

winding the band around the outer circumference of the boot;

overlapping part of the band on itself over the boot;

clamping the clamping members;

cutting off a section of said band surrounding the boot; and welding the overlapping part of the band;

said gap forming step includes moving the inner surface of each of the clamping members adjacent each other to form an approximately round shape; and said clamping step includes moving each of the lower clamping members upward and pressing a lower part of the band against the boot, then moving said pair of upper clamping members inward and moving the respective upper ends of the lower clamping members inward such that the movement of said lower clamping members clamps the band against the boot upwardly, and then moving each of said upper clamping members to clamp an upper part of the band.

2. A method for winding and fixing a band according to claim 1, wherein said lateral pair of lower clamping members tilt inward to clamp the band upwardly when the pair of upper clamping members move inward.

3. A method for winding and fixing a band according to claim 1 further including steps of setting a back bar on said boot to press a part of the boot prior to the band insertion step, said overlapping part of the band is disposed on the back bar during the overlapping step, and, after welding is completed and before the clamping members are released, removing the back bar.

4. A method for winding and fixing a band according to claim 1 including the further step of applying tension to the band from a band insertion direction so as to pull the band while clamping each of the lower clamping members and each of the upper clamping members, prior to said welding step.

5. A method for winding and fixing a band according to claim 1, further including steps of installing above a gap between the lateral pair of upper clamping members an intermediate clamp member that can be elevated and lowered, placing a back bar between the overlapping part of the band and the upper part of the outer circumference of the boot located under the overlapping part, and lowering said intermediate clamp member to press the overlapping part of the band downward against the back bar such that the intermediate clamp member and the back bar sandwich the overlapping part, prior to said welding step.

6. A method for winding and fixing a band according to claim 5 wherein said back bar is placed such that an outer end of said overlapping part is located outside an end of said back bar so that a part of the intermediate clamp member which presses said outer end cuts the outer end when this outer end is pressed by one end of said clamp to press and hold the overlapping section.

7. A method for winding and fixing a band according to claim 1, wherein sequential movements of said lower clamping members and said upper clamping members in said clamping step removes the looseness in said band about the boot, and said lower clamping members press a side portion of the band when said clamping members are moved inwardly to clamp the band upwardly.

8. Apparatus for winding and fixing a band about a boot, comprising:

means for winding a band about an outer circumference of a boot;

means for temporarily clamping the wound band about the boot; and means for fixing the clamped, wound band about the boot;

said clamping means includes a lateral pair of upper clamping members, a lateral pair of lower clamping members, and means for moving the upper and lower clamping members relative to the boot;

said winding means includes inner surfaces of said upper and lower clamping members which form an approximately round shape spaced by a gap from an outer circumferential surface of the boot when moved adjacent each other to surround the boot, and said winding means inserts the band through the gap and overlaps a part of the band on itself over the boot;

said moving means moves the lower clamping members to press a lower portion of the wound band against the boot, then moves the upper clamping members inward and moves respective upper ends of the lower clamping members inward such that the lower clamping members clamp the band against the boot upwardly, then moves the upper clamping members to clamp an upper part of the band; and said fixing means includes means for cutting an excess portion of the band and means for welding the overlapping part of the band.

9. An apparatus for winding and fixing a band according to claim 8, wherein said moving means tilts said lower pair of clamping members inward to clamp the band upwardly when the moving means moves the upper clamping members inward.

10. An apparatus for winding and fixing a band according to claim 9 wherein said lateral pair of lower clamping member have their inner lower ends supported by a common shaft in such a way that the clamping member can oscillate.

11. An apparatus for winding and fixing a band according to claim 9 wherein said lateral pair of upper clamping member each include a shoulder in its inner lower part and each said lower clamping member includes an abutting section in its outer upper part, and said shoulders abut the abutting sections of the lateral pair of lower clamping members to tilt the lateral pair of lower clamping member inward when the lateral pair of upper clamping members move inward.

12. An apparatus for winding and fixing a band according to claim 8 wherein said lateral pair of upper clamping members and said lateral pair of lower clamping members each comprise an inner guide plate that can move in clamping and unclamping directions, said plates located on both sides of the guide plate, and biasing means for applying an inward fore to the side plates such that edges of the side plates can protrude beyond an inner surface of the guide plate and retreat to an original position thereof.

13. An apparatus for winding and fixing a band according to claim 12 wherein said winding means further includes a groove for restricting lateral movement of the band, said groove is defined by protruding portions of the side plates and the inner surface of each of the clamping members.

14. An apparatus for winding and fixing a band according to claim 5 wherein inner surfaces of said guide plates form a continuous approximately round band guide surface and said side plates abut the outer circumference of the boot and retreat to clamp the band against the outer circumference of the boot when the clamping members are clamped.

15. An apparatus for winding and fixing a band according to claim 8 wherein said moving means includes a cam and a mechanism operating in response to the cam or moving said lateral pair of upper clamping members symmetrically inward in the band clamping direction, and a pressing mechanism for moving said lateral pair of lower clamping members upward.

16. An apparatus for winding and fixing a band according to claim 15 wherein said mechanism operating in response to the cam is a slider mechanism.

17. An apparatus for winding and fixing a band according to claim 8, wherein said lateral pair of upper clamping members and said lateral pair of lower clamping members each include a guide plate having an inner guide surface along which an inserted band travels as part of said winding means, and each said guide plate includes on an end thereof at least one of a convex and a recess shaped to receive the convex such that adjacent ones of the guide plates engage with each other through said convexes and said recesses.

18. An apparatus for winding and fixing a band according to claim 17 wherein each said convex comprises a projection on a downstream end of one of the clamping members protruding toward the adjacent clamping member and each said recess is formed on an upstream end of one of said clamping member and shaped for engaging with the convex of the adjacent clamping member.

19. An apparatus for winding and fixing a band according to claim 18 wherein said winding means includes inner surfaces of said guide plates, convexes and recesses which form a guide inner surface for inserting and guiding the band when engaged together, said guide inner surface being an approximately continuous round shape.

20. An apparatus for winding and fixing a band according to claim 8, including: back bar means for being set on the upper part of the boot to press the part prior to band winding such that the overlapping part of the band is wrapped on the back bar means, said back bar means includes a pressing section for being disposed between the upper part of said boot and the overlapping part of the band, and means for moving the pressing section in the axial direction of the boot.

21. An apparatus for winding and fixing a band according to claim 20 wherein a welding receiving section is provided on the upper surface of the pressing section of said back bar means.

22. An apparatus for winding and fixing a band according to claim 8, further including:
   a clamp means for clamping the overlapping part of the band and for being elevated and lowered relative to a gap between said lateral pair of upper clamping members;
   a back bar means for being disposed between the overlapping part of said band and an upper part of the outer circumference of said boot; and
   said clamp means including a clamp member which is lowered to press the overlapping part of the band downward against said back bar means.

23. An apparatus for winding and fixing a band according to claim 22 wherein an upper surface of a pressing section of said back bar means and a lower pressing surface of the clamp means are each curved in accordance with a curvature of the wound band, and a radius of each of said curved surfaces is set to a value smaller than that of the outer circumference of the boot.

24. An apparatus for winding and fixing a band according to claim 22 wherein said clamp means further includes a cutter integral with said clamp member at its upstream end, the cutter cutting off the band when the clamp member presses the overlapping part of the band downward.

25. An apparatus for winding and fixing a band according to claim 24 further including a pair of band guides for guiding the insertion and progress of the band and which are located outwardly of said clamp member and said cutter, respectively, each said band guide having a groove for guiding the band on a lower surface thereof.

26. An apparatus for winding and fixing a band according to claim 25 wherein said band guide ares located on opposite sides of said clamp means such that the clamp means can be elevated and lowered in the middle of the band guides, and the apparatus further includes means for applying force to the band guides so that they can be closed inward.

27. An apparatus for winding and fixing a band according to claim 26 wherein said band guides each have a cam roller in its inner side, a cam surface is formed on both sides of the clamp means located in the middle of the band guides, and said rollers engage with said cam surfaces to open the band guides when the clamp and cutter is lowered to press the overlapping part of the band.

28. An apparatus for winding and fixing a band according to claim 27 wherein said clamp member includes a vertical gap therein for allowing welding laser beams to pass through, and the back bar means includes a pressing section of said back bar for being disposed under the overlapping part of the band, the pressing section includes grooves for receiving welding laser beams.

29. A method for winding and fixing a band comprising the steps of:
   using a lateral pair of upper clamping members and a lateral pair of lower clamping members to surround a boot;
   forming a gap between an inner surface of each of the clamping members and an outer circumference of the boot, said gap forming step includes moving the inner sufaces of the clamping members adjacent to each other to form an approximately round shape;
   inserting a band into the gap;
   winding the band around the outer circumference of the boot;
   overlapping part of the band on itself over the boot;
   clamping the clamping members, said clamping step includes moving each of the lower clamping members upward and pressing a lower part of the band against the boot, then moving said pair of upper clamping members inward and moving the respective upper ends of the lower clamping members inward such that the movement of the lower clamping members clamps the band against the boot upwardly, and then moving each of said upper clamping members to clamp an upper part of the band;
   placing a back bar between said overlapping part of the band and the upper part of the outer circumference of the boot, and, before setting the back bar on the outer circumference of the boot, applying lubricating oil to a portion of the outer circumference of the boot which the back bar abuts;
   cutting off a section of said band surrounding the boot; and
   welding the overlapping part of the band.

30. An apparatus for winding and fixing a band about a boot, comprising:
   means for winding a band about an outer circumference of a boot;
   means for clamping the wound band about the boot;
   said clamping means includes a lateral pair of upper clamping members, a lateral pair of lower clamping members, and means for moving the upper and lower clamping members relative to boot;
   said winding means includes inner surfaces of said upper and lower clamping members which form an approximately round shape shaped by a gap from an outer circumferential surface of the boot when moved adjacent to each other to surround the boot, and said winding means inserts the band through the gap and overlaps a part of the band on itself over the boot;
   back bar means for being disposed between the overlapping part of the band and the outer circumference of the boot;
   means for applying lubricating oil to a portion of the outer circumference of the boot prior to engagement with said back bar means; and
   means for fixing clamped, wound about the boot;
   said moving means moves said lower clamping members to press a lower portion of the wound band against the boot, then moves the upper clamping members inward and moves respective upper ends of the lower clamping members inward such that the lower clamping members clamp the band against the boot upwardly, and then moves the upper clamping members to clamp an upper part of the band; and said fixing means includes means for cutting an excess portion of the band and means for welding the overlapping part of the band.

31. An apparatus for winding and fixing a band to implement the method according to claim 30 wherein said means for applying lubricating oil to the outer circumference of the boot is set adjacent to a portion of the boot to which the band is wound and fixed.

32. An apparatus for winding and fixing the band about a boot, comprising:

means for winding a band about an outer circumference of a boot;

means for clamping the wound band about the boot; and means for fixing the clamped, wound band about the boot;

said clamping means includes a lateral pair of upper clamping members, a lateral pair of lower clamping members, and means for moving the upper and lower clamping members relative to the boot;

said winding means includes inner surfaces of said upper and lower clamping members which form an approximately round shape spaced by a gap from an outer circumferential surface of the boot when moved adjacent to each other to surround the boot, and said winding means inserts the band through the gap and overlaps the part of the band on itself over the boot;

said moving means moves the lower clamping members to press a lower portion of the wound band against the boot, then moves the upper clamping members inward and moves respective upper ends of the lower clamping members inward such that the lower clamping members clamp the band against the boot upwardly, and then moves the upper clamping members to clamp an upper part of the band;

said fixing means includes means for cutting an excess portion of the band and means for welding the overlapping part of the band;

said winding means further includes a means for supplying said band around the outer circumference of the boot;

a feed detection means for detecting the feed of the band;

a first comparison and determination means for comparing the actual feed of the band to a set value to make a first determination, said clamping means operating based on results of the first determination;

a band return instruction means for instructing for reverse movement of the band;

a band return detection means for detecting reverse movement of the band;

a second comparison and determination means for comparing the actual reverse movement of the band to a set value to make a second determination;

a display means for displaying results of the first and second determinations; and a control means for controlling the above means.

33. A method for winding and fixing a band comprising the steps of:

using a lateral pair of upper clamping members and a lateral pair of lower clamping members to surround a boot;

forming between a gap an inner surface of each of the clamping members and an outer circumference of the boot, said gap forming step includes moving the inner surface of each of the clamping members adjacent to each other to form an approximately round shape;

inserting the band into the gap;

winding the band around the outer circumference of the boot;

detecting feed of the band;

comparing the detected feed of the band to a set value to make a first determination;

clamping the clamping members based on results of said first determination, said clamping step including moving each of the lower clamping members upward and pressing a lower part of the band against the boot, then moving said pair of upper clamping members inward and moving respective upper ends of the lower clamping members inward such that the movement of the lower clamping members clamps the band against the boot upwardly, and then moving each of said upper clamping members to clamp an upper part of the band;

reversing movement of said band;

detecting reverse movement of said band;

comparing the detected reverse movement of the band to a set value to make a second determination;

displaying results of said first and second determinations;

if said first determination indicates the feed rate is out of a specified range said display step indicates an error in order to stop winding of the band;

cutting off a section of said band surrounding the boot; and welding the overlapping part of the band.

34. A method for winding and fixing a band according to claim 33 wherein if the reverse band movement is within a specified range, said display step indicates that the band has been wound around the outer circumference of the boot properly, and, if the reverse band movement is out of the specified range said display step indicates an error in order to stop the winding of the band.

35. Apparatus for winding and clamping a band about an outer circumference of a boot, comprising:

means for guiding and winding a band around an outer circumference of a boot such that an end of the band is wound around the outer circumference of the boot and overlapped with another portion of the band; and means for clamping the wound band tightly against the outer circumference of said boot such that the end and overlapped portion of the band may be fixed together;

said clamping means including a lateral pair of upper clamping members, a lateral pair of lower clamping members, and means for moving the clamping members relative to said boot;

said guiding and winding means including inner surfaces of the clamping members which define an approximately round shaped spaced by a gap from the outer circumference of said boot when said clamping members are moved adjacent to each other; and said moving means sequentially moves said lower clamping members and said upper clamping members, respectively, inwardly toward said boot such that the wound band engages and is tightly fitted around said boot and such that the said band may be tensioned while clamped by said clamping means.

36. Apparatus for winding and clamping a band according to claim 35, further including means for applying tension to the band from a band insertion direction so as to pull the band while the band is clamped by said clamping means.

37. Apparatus for winding and clamping a band according to claim 35, wherein said moving means removes looseness in said band around said boot as said moving means sequentially moves lower clamping members and said upper clamping members, respectively, into engagement with said boot.

38. Apparatus for winding and clamping a band according to claim 35, wherein said moving means sequentially moves said lower clamping members and said upper clamping members in at least three distinct clamping steps.

39. Apparatus for winding and fixing the band about a boot, according to claim 8, further including:

means for applying tension to the band from a band insertion direction so as to pull the band while the band is clamped by said clamping means.

\* \* \* \* \*

UNITED STATES PATENT AND TRADEMARK OFFICE
CERTIFICATE OF CORRECTION

PATENT NO. : 5,590,694

DATED : January 7, 1997

INVENTOR(S) : Naito et al.

It is certified that error appears in the above-indentified patent and that said Letters Patent is hereby corrected as shown below:

TITLE PAGE:

In the section entitled Foreign Patent Documents, change "2076648" to --2-76648--.

Column 1, line 13, after "covering" insert --ends--.

Column 3, line 9, after "from" insert -- the--.

Column 6, line 6, delete "Is".

Column 7, line 60, change "21d" to --21a--.

Column 8, line 45, change "Groove" to --Grooves--.

Column 8, line 59, delete "the".

Column 12, line 47, after "44" insert --is--.

Column 12, line 49, change "passing" to --pressing--.

Column 13, line 30, delete "be".

Column 14, line 10, after "move" insert --the band--; delete "the band".

Column 14, line 35, delete "or".

Column 16, line 44, after "and' insert --an--.

Column 18, line 30, change "fore" to --force--.

Column 18, line 46, change "or" to --for--.

Column 19, line 1, change "member" to --members--.

UNITED STATES PATENT AND TRADEMARK OFFICE
CERTIFICATE OF CORRECTION

PATENT NO. : 5,590,694
DATED : January 7, 1997
INVENTOR(S) : Naito et al.

It is certified that error appears in the above-indentified patent and that said Letters Patent is hereby corrected as shown below:

Column 20, line 51, change "shaped" to --spaced--.

Signed and Sealed this

Thirteenth Day of May, 1997

Attest:

BRUCE LEHMAN

Attesting Officer    Commissioner of Patents and Trademarks